United States Patent
Ochiai

(10) Patent No.: US 12,143,554 B2
(45) Date of Patent: Nov. 12, 2024

(54) IMAGE PROCESSING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Tsubasa Ochiai, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/451,409

(22) Filed: Aug. 17, 2023

(65) Prior Publication Data
US 2024/0098208 A1  Mar. 21, 2024

(30) Foreign Application Priority Data
Sep. 12, 2022 (JP) .................... 2022-144605

(51) Int. Cl.
*H04N 1/405* (2006.01)
(52) U.S. Cl.
CPC .................. *H04N 1/405* (2013.01)
(58) Field of Classification Search
CPC ....................................... H04N 1/405
USPC ...................... 358/3.06, 1.9, 1.15
See application file for complete search history.

(56) References Cited

U.S. PATENT DOCUMENTS

| | | | | |
|---|---|---|---|---|
| 2009/0141310 A1* | 6/2009 | Matsuoka | .......... | H04N 1/40062 358/3.06 |
| 2009/0257093 A1* | 10/2009 | Kawabe | ............. | H04N 1/40075 358/3.06 |
| 2018/0024791 A1* | 1/2018 | Chang | ................... | G06F 3/1292 358/1.15 |

FOREIGN PATENT DOCUMENTS

| | | |
|---|---|---|
| JP | 2000305429 A | 11/2000 |
| JP | 2010213209 A | 9/2010 |

* cited by examiner

*Primary Examiner* — Quang N Vo
(74) *Attorney, Agent, or Firm* — ROSSI, KIMMS & McDOWELL LLP

(57) ABSTRACT

An image processing apparatus capable of changing a halftone pattern set to a coding pattern that will be synthesized with an image to another halftone pattern that can uniformly generate the coding pattern when the coding pattern cannot be uniformly generated in performing a halftone process using the halftone pattern set to the cording pattern. A setting unit sets a halftone pattern used in a halftone process from among a plurality of halftone patterns. A determination unit determines whether a coding pattern can be uniformly generated when the halftone process is performed using the halftone pattern set by the setting unit as the coding pattern to be synthesized with an image to be printed. A changing unit changes a halftone pattern used in the halftone process to another halftone pattern capable of uniformly generating the coding pattern when the determination unit determines that the coding pattern cannot be uniformly generated.

12 Claims, 22 Drawing Sheets

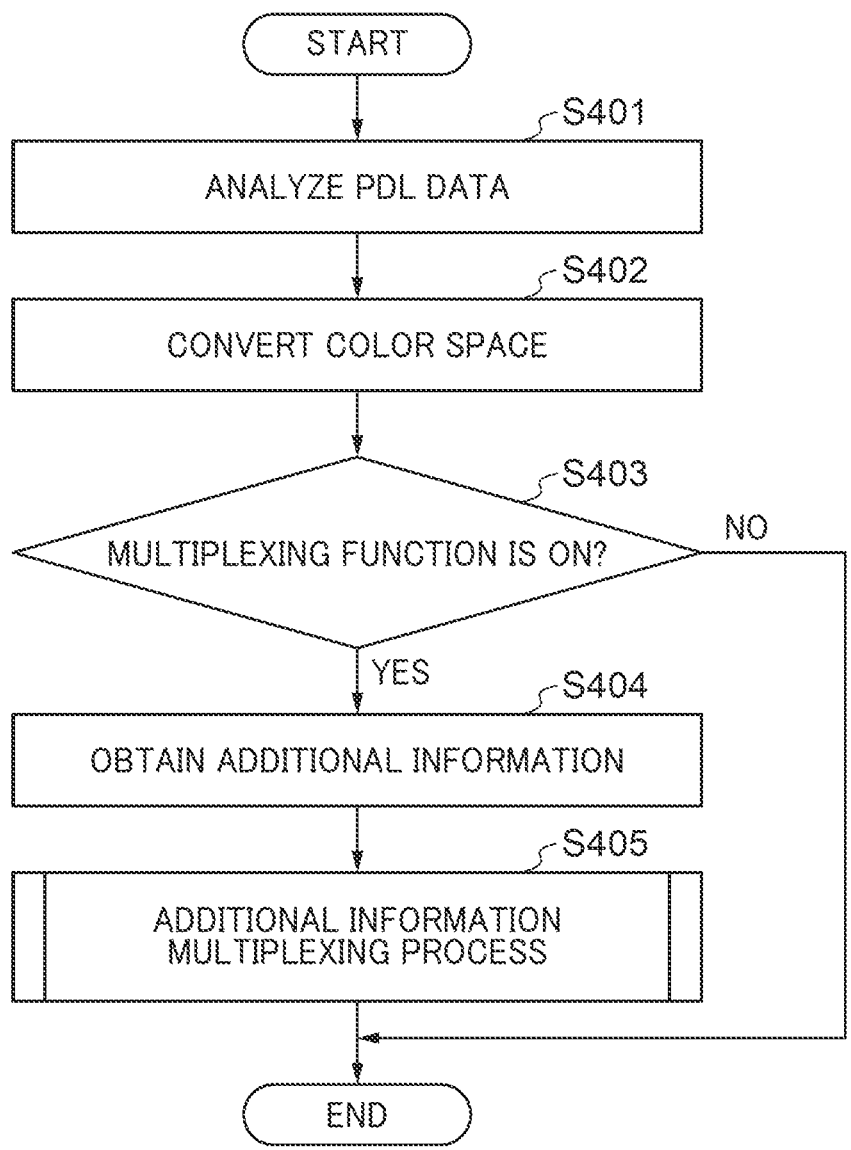

*FIG. 6A*

| 0 | 0 | 0 | 0 | 72 | 72 | 72 | 72 | 72 | 72 |
|---|---|---|---|----|----|----|----|----|----|
| 0 | 0 | 72 | 72 | 72 | 72 | 72 | 72 | 0 | 0 |
| 72 | 72 | 72 | 72 | 72 | 72 | 0 | 0 | 0 | 0 |
| 72 | 72 | 72 | 72 | 0 | 0 | 0 | 0 | 72 | 72 |
| 72 | 72 | 0 | 0 | 0 | 0 | 72 | 72 | 72 | 72 |
| 0 | 0 | 0 | 0 | 72 | 72 | 72 | 72 | 72 | 72 |
| 0 | 0 | 72 | 72 | 72 | 72 | 72 | 72 | 0 | 0 |
| 72 | 72 | 72 | 72 | 72 | 72 | 0 | 0 | 0 | 0 |
| 72 | 72 | 72 | 72 | 0 | 0 | 0 | 0 | 72 | 72 |
| 72 | 72 | 0 | 0 | 0 | 0 | 72 | 72 | 72 | 72 |

*FIG. 6B*

| 0 | 0 | 72 | 72 | 72 | 0 | 0 | 72 | 72 | 72 |
|---|---|----|----|----|---|---|----|----|----|
| 0 | 0 | 72 | 72 | 72 | 0 | 0 | 72 | 72 | 72 |
| 72 | 0 | 0 | 72 | 72 | 72 | 0 | 0 | 72 | 72 |
| 72 | 0 | 0 | 72 | 72 | 27 | 0 | 0 | 72 | 72 |
| 72 | 72 | 0 | 0 | 72 | 72 | 72 | 0 | 0 | 72 |
| 72 | 72 | 0 | 0 | 72 | 72 | 72 | 0 | 0 | 0 |
| 72 | 72 | 72 | 0 | 0 | 72 | 72 | 72 | 0 | 0 |
| 72 | 72 | 72 | 0 | 0 | 72 | 72 | 72 | 0 | 0 |
| 0 | 72 | 72 | 72 | 0 | 0 | 72 | 72 | 72 | 0 |
| 0 | 72 | 72 | 72 | 0 | 0 | 72 | 72 | 72 | 0 |

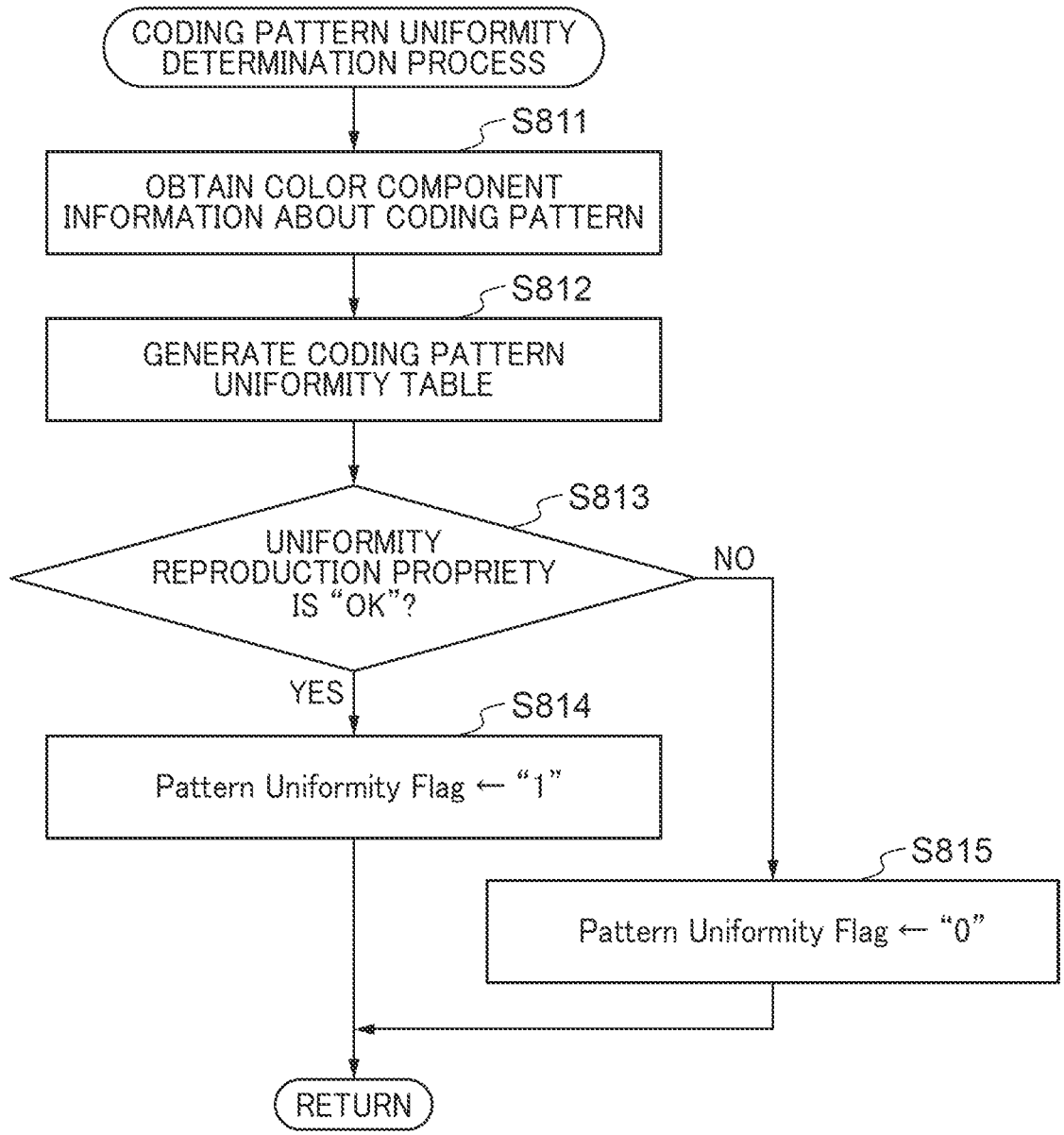

FIG. 9

| | Cyan | Magenta | Yellow | Black |
|---|---|---|---|---|
| PATTERN 1 | 134 dpi, 27 deg, DOT | 166 dpi, 34 deg, DOT | 134 lpi, 117 deg, LINE | 141 dpi, 45 deg, DOT |
| PATTERN 2 | 190 dpi, 72 deg, DOT | 134 lpi, 117 deg, LINE | 240 dpi, 90 deg, DOT | 212 dpi, 45 deg, DOT |
| PATTERN 3 | 268 dpi, 63 deg, DOT | 268 dpi, 27 deg, DOT | 300 dpi, 0 deg, DOT | 282 dpi, 45 deg, DOT |

PATTERN 1 — DEFAULT (LOW LINE NUMBER)
PATTERN 2 — DEFAULT (HIGH LINE NUMBER)

FIG. 10A
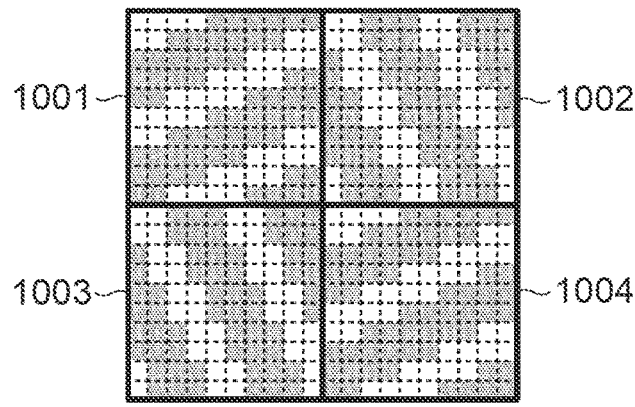
FIG. 10B
| 0 | 40 | 80 | 67 | 107 | 147 | 187 | 174 | 214 | 254 |
|---|---|---|---|---|---|---|---|---|---|
| 53 | 94 | 134 | 120 | 160 | 201 | 241 | 227 | 27 | 13 |
| 107 | 147 | 187 | 174 | 214 | 254 | 0 | 40 | 80 | 67 |
| 160 | 201 | 241 | 227 | 27 | 13 | 53 | 94 | 134 | 120 |
| 214 | 254 | 0 | 40 | 80 | 67 | 107 | 147 | 187 | 174 |
| 27 | 13 | 53 | 94 | 134 | 120 | 160 | 201 | 241 | 227 |
| 80 | 67 | 107 | 147 | 187 | 174 | 214 | 254 | 0 | 40 |
| 134 | 120 | 160 | 201 | 241 | 227 | 27 | 13 | 53 | 94 |
| 187 | 174 | 214 | 254 | 0 | 40 | 80 | 67 | 107 | 147 |
| 241 | 227 | 27 | 13 | 53 | 94 | 134 | 120 | 160 | 201 |
| 0 | 40 | 80 | 67 | 107 | 147 | 187 | 174 | 214 | 254 |
| 53 | 94 | 134 | 120 | 160 | 201 | 241 | 227 | 27 | 13 |
| 107 | 147 | 187 | 174 | 214 | 254 | 0 | 40 | 80 | 67 |
| 160 | 201 | 241 | 227 | 27 | 13 | 53 | 94 | 134 | 120 |
| 214 | 254 | 0 | 40 | 80 | 67 | 107 | 147 | 187 | 174 |
| 27 | 13 | 53 | 94 | 134 | 120 | 160 | 201 | 241 | 227 |
FIG. 10C
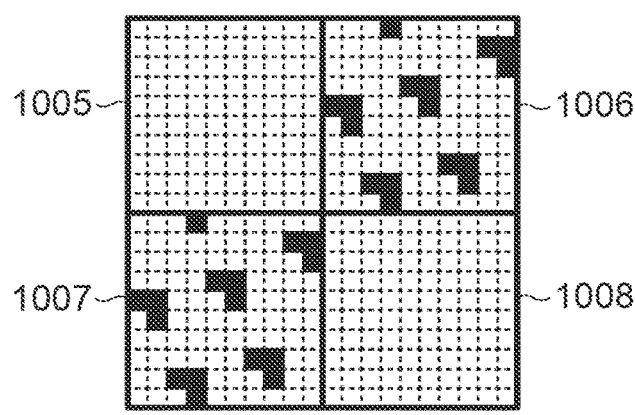

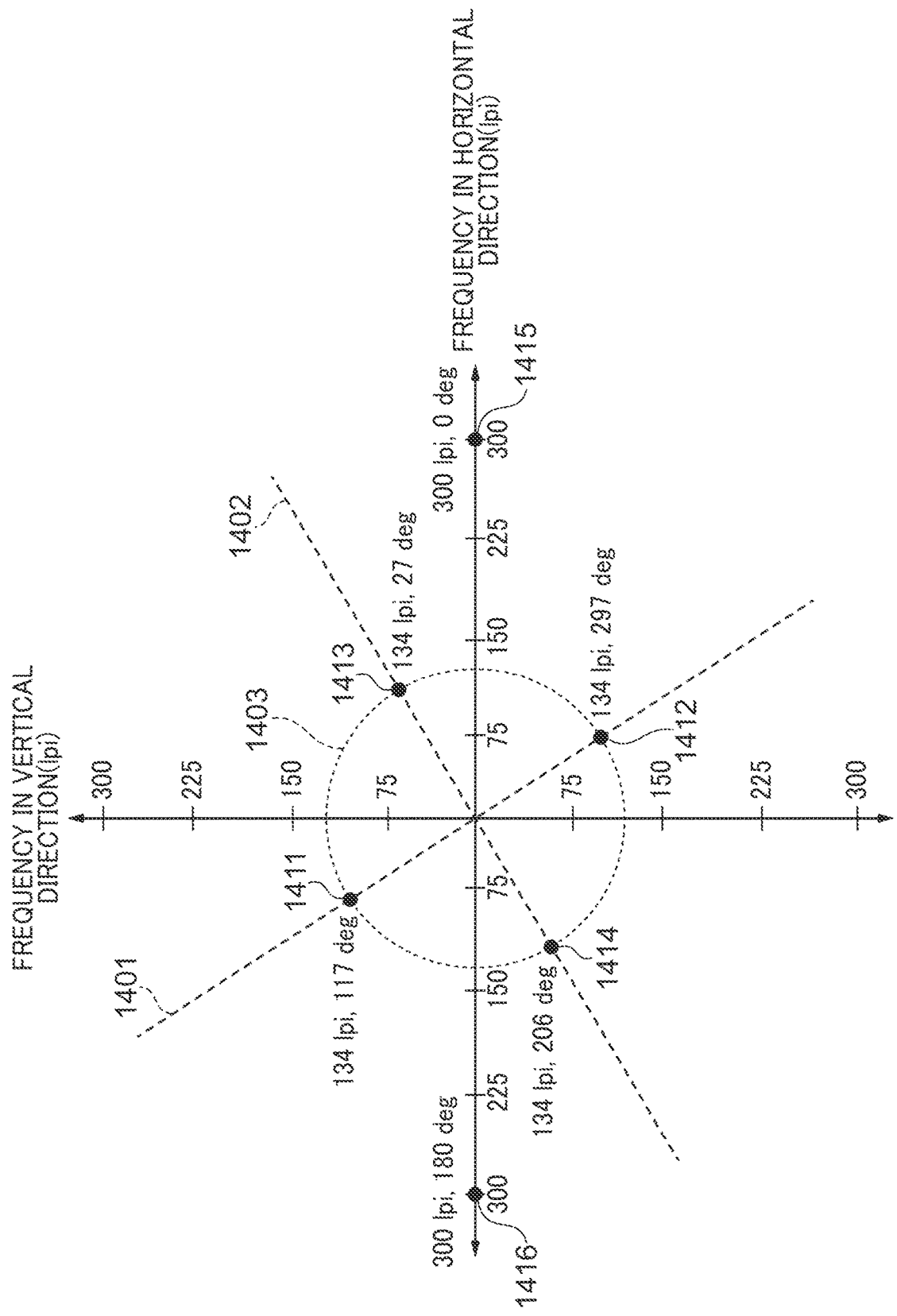

FIG. 15A

| 0 | 0 | 0 | 0 | 2 | 2 | 2 | 2 | 2 | 2 |
|---|---|---|---|---|---|---|---|---|---|
| 0 | 0 | 2 | 2 | 2 | 2 | 2 | 2 | 0 | 0 |
| 2 | 2 | 2 | 2 | 2 | 2 | 0 | 0 | 0 | 0 |
| 2 | 2 | 2 | 2 | 0 | 0 | 0 | 0 | 2 | 2 |
| 2 | 2 | 0 | 0 | 0 | 0 | 2 | 2 | 2 | 2 |
| 0 | 0 | 0 | 0 | 2 | 2 | 2 | 2 | 2 | 2 |
| 0 | 0 | 2 | 2 | 2 | 2 | 2 | 2 | 0 | 0 |
| 2 | 2 | 2 | 2 | 2 | 2 | 0 | 0 | 0 | 0 |
| 2 | 2 | 2 | 0 | 0 | 0 | 0 | 2 | 2 | 2 |
| 2 | 2 | 0 | 0 | 0 | 0 | 2 | 2 | 2 | 2 |

FIG. 15B

| 0 | 0 | 2 | 2 | 2 | 0 | 0 | 2 | 2 | 2 |
|---|---|---|---|---|---|---|---|---|---|
| 0 | 0 | 2 | 2 | 2 | 0 | 0 | 2 | 2 | 2 |
| 2 | 0 | 0 | 2 | 2 | 2 | 0 | 0 | 2 | 2 |
| 2 | 0 | 0 | 2 | 2 | 27 | 0 | 0 | 2 | 2 |
| 2 | 2 | 0 | 0 | 2 | 2 | 2 | 0 | 0 | 2 |
| 2 | 2 | 0 | 0 | 2 | 2 | 2 | 0 | 0 | 0 |
| 2 | 2 | 2 | 0 | 0 | 2 | 2 | 2 | 0 | 0 |
| 2 | 2 | 2 | 0 | 0 | 2 | 2 | 2 | 0 | 0 |
| 0 | 2 | 2 | 2 | 0 | 0 | 2 | 2 | 2 | 0 |
| 0 | 2 | 2 | 2 | 0 | 0 | 2 | 2 | 2 | 0 |

IMAGE PROCESSING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus, a control method therefor, and a storage medium storing a control program therefor.

Description of the Related Art

A digital watermark technique that embeds additional information other than image information in an image (hereinafter referred to as "multiplexing") is known. In the digital watermark technique, additional information, such as an author name and usage permission information, is multiplexed on an image, such as a photograph or a painting, so as to be difficult to visually discriminate. In the meantime, there is also a case where additional information is multiplexed so as to appear as a white background like a check character of a copy-forgery-inhibited pattern in order to improve accuracy of extracting additional information from an image.

As a method of multiplexing additional information in an image, there is a known technique of modulating a pixel value in a local region of the image and synthesizing a pattern image (hereinafter referred to as a "coding pattern") representing the additional information with the image. In Japanese Patent Laid-Open Publication No. 2000-305429 (JP 2000-305429A), an image is divided into blocks each of which has 16 pixels (4×4 pixels). In each block, pixel values of 8 pixels as a half of the 16 pixels are modulated in a plus direction, and pixel values of 8 pixels as a remaining half are modulated in a minus direction. The image synthesized with the coding pattern in this way is subjected to a halftone process and then is printed by a printer. The additional information on a printed matter generated in this way is extracted by analyzing a scanned image of the printed matter and executing a decoding process.

However, when the halftone process is performed to the coding pattern, reproducibility of some patterns is reduced and decoding may eventually fail. For example, in a configuration in which a dither method is used as the halftone process, when a screen angle of a color plane synthesized with a coding pattern coincides with an angle of the coding pattern, the coding pattern is lost.

In the meantime, in a configuration using an error diffusion method that does not have a specific frequency component or angle, a plurality of patterns are not uniformly reproduced depending on an error diffusion direction, and a case occurs where some patterns can be decoded but other patterns cannot be decoded. Against this, there is a known technique that controls, when a watermark image is synthesized, so that the pattern will be changed to a halftone pattern that does not easily interfere with a coding pattern (see Japanese Patent Laid-Open Publication No. 2010-213209 (JP2010-213209A)).

Incidentally, since an interfering color component depends on a color component of a coding pattern that is synthesized, it is necessary to select a halftone pattern that does not easily interfere in accordance with the color component to be synthesized. However, since the technique disclosed in JP2010-213209 does not consider the color component of the coding pattern to be synthesized in selecting the halftone pattern, it is impossible to select an appropriate halftone pattern according to the color component to be synthesized.

SUMMARY OF THE INVENTION

The present invention provides a mechanism capable of changing a halftone pattern set to a coding pattern that will be synthesized with an image to be printed to another halftone pattern that can uniformly generate the coding pattern in a case where the coding pattern cannot be uniformly generated in performing a halftone process using the halftone pattern set to the coding pattern.

Accordingly, an aspect of the present invention provides an image processing apparatus including a setting unit configured to set a halftone pattern used in a halftone process from among a plurality of halftone patterns, a determination unit configured to determine whether a coding pattern can be uniformly generated in a case where the halftone process is performed using the halftone pattern set by the setting unit as the coding pattern to be synthesized with an image to be printed, and a changing unit configured to change a halftone pattern used in the halftone process to another halftone pattern capable of uniformly generating the coding pattern in a case where the determination unit determines that the coding pattern cannot be uniformly generated.

According to the present invention, a halftone pattern set to a coding pattern that will be synthesized with an image to be printed can be changed to another halftone pattern that can uniformly generate the coding pattern in a case where the coding pattern cannot be uniformly generated in performing a halftone process using the halftone pattern set to the coding pattern.

Further features of the present invention will become apparent from the following description of exemplary embodiments with reference to the attached drawings.

BRIEF DESCRIPTION OF THE DRAWINGS

FIG. 4A and FIG. 4B are flowcharts showing procedures of a multiplexing control process executed in the additional information multiplexing apparatus in FIG. 1A.

FIG. 6A and FIG. 6B are views for describing methods of calculating pixel values when the additional information multiplexing apparatus in FIG. 1A synthesizes a coding pattern.

FIG. 8A, FIG. 8B, FIG. 8C, and FIG. 8D are flowcharts showing procedures of a control process performed in a controller in FIG. 7.

FIG. 9 is a view showing halftone patterns that can be used by the image forming apparatus in FIG. 1A.

FIG. 10A, FIG. 10B, and FIG. 10C are views for describing reproducibility of a coding pattern.

FIG. 14 is a schematic view showing difference in frequency characteristics in a two-dimensional frequency domain in a Y-plane in the embodiment.

FIG. 15A and FIG. 15B are views showing examples of high pass filters with particular frequency-vector directionalities.

DESCRIPTION OF THE EMBODIMENTS

Figure 1A:
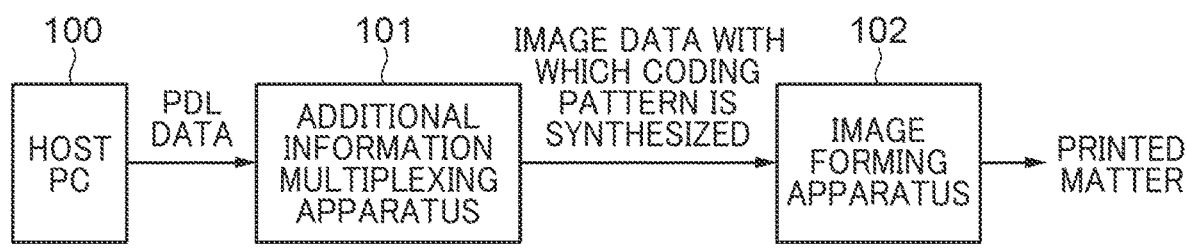
FIG. 1A and FIG. 1B are views for describing multiplexing of additional information and extraction of the additional information in an embodiment.

Hereafter, embodiments according to the present invention will be described in detail by referring to the drawings. It should be noted that the following embodiments are not intended to limit the scope of the claims of the present invention, and all combinations of features described in the embodiments are not necessarily essential to the solution of the present invention. The same components are denoted by the same reference numerals, and descriptions thereof will be omitted.

Figure 1B:
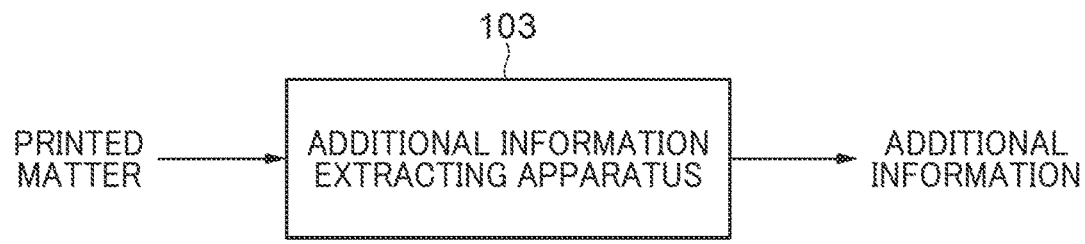

FIG. 1A and FIG. 1B are views for describing multiplexing of additional information and extraction of the additional information in an embodiment.

In this embodiment, additional information is multiplexed by a host PC 100, an additional information multiplexing apparatus 101, and an image forming apparatus 102 shown in FIG. 1A.

The host PC 100 converts an image or a document into PDL data by a printer driver 212 in FIG. 2 described later, and transmits the PDL data to the additional information multiplexing apparatus 101 via a network 240 in FIG. 2. PDL is an abbreviation of Page Description Language. The PDL data includes ON/OFF information about a multiplexing function, additional information, etc.

The additional information multiplexing apparatus 101 rasterizes the PDL data received from the host PC 100. For example, when the multiplexing function is OFF, the additional information multiplexing apparatus 101 transmits the rasterized image data to the image forming apparatus 102 via the network 240 described later. In the meantime, when the multiplexing function is ON, the additional information multiplexing apparatus 101 encodes the additional information into binary data represented by a binary number and converts the binary data into a coding pattern. Further, the additional information multiplexing apparatus 101 synthesizes the coding pattern with the image data obtained by rasterization. The additional information multiplexing apparatus 101 transmits the image data synthesized with the coding pattern to the image forming apparatus 102 via the network 240 described later. Details of the process by the additional information multiplexing apparatus 101 will be described later.

The image forming apparatus 102 converts the received image data into image data for printing, and performs a printing process based on the image data for printing. Thus, a printed matter on which the additional information is multiplexed is generated.

Also, in this embodiment, the additional information is extracted by the additional information extraction apparatus 103 shown in FIG. 1B.

The additional information extraction apparatus 103 reads a printed matter and generates scan image data of the printed matter or receives image data obtained by capturing via the network 240 described below. When additional information is multiplexed on the image data, the additional information extraction apparatus 103 extracts a coding pattern. The additional information extraction apparatus 103 converts the extracted coding pattern into binary data represented by a binary number, and decodes the binary data into the original additional information. Thus, the additional information can be extracted from the printed matter on which the additional information is multiplexed.

Next, the host PC 100 in this embodiment will be described.

Figure 2:
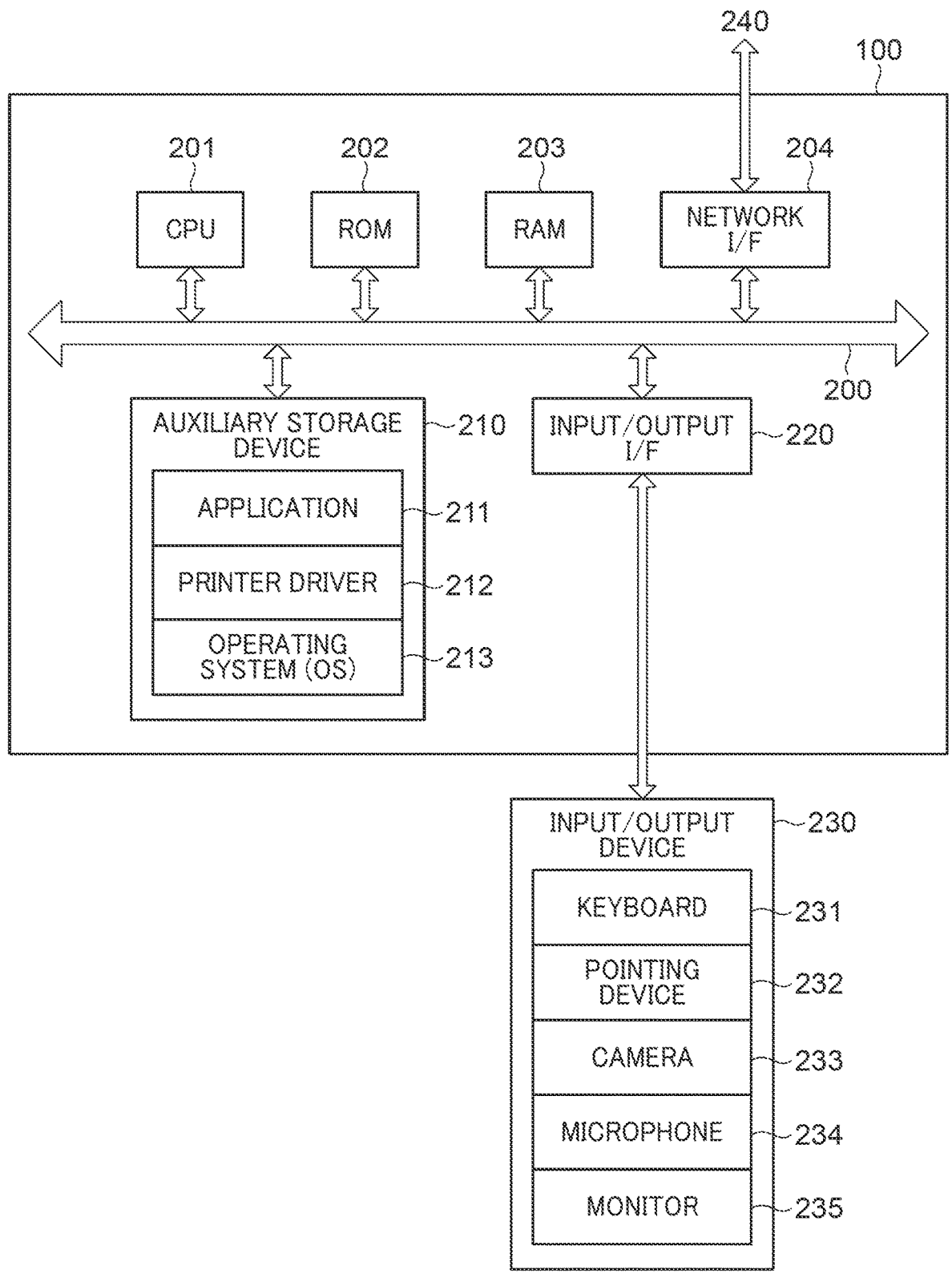
FIG. 2 is a block diagram schematically showing a hardware configuration of a host PC in FIG. 1A.

FIG. 2 is a block diagram schematically showing a hardware configuration of the host PC 100 in FIG. 1. As shown in FIG. 2, the host PC 100 includes a CPU 201, a ROM 202, a RAM 203, a network I/F 204, an auxiliary storage device 210, and an input/output I/F 220. These components are mutually connected via an internal bus 200.

The CPU 201 performs overall control of the host PC 100 in accordance with programs stored in the ROM 202, RAM 203, and auxiliary storage device 210. The ROM 202 stores various programs. The RAM 203 is used as a work area when the CPU 201 performs various processes. The auxiliary storage device 210 stores an application 211, a printer driver 212, an operating system (OS) 213, etc.

The network I/F 204 is an interface for data transmission and reception between the host PC 100 and an external apparatus connected to the network 240, for example, the additional information multiplexing apparatus 101. An input/output device 230 is connected to the input/output I/F 220. The input/output device 230 includes, for example, a keyboard 231, a pointing device 232, a camera 233, a microphone 234, and a monitor 235. The keyboard 231 and the pointing device 232 are input devices for the user to input various instructions to the host PC 100. The camera 233 has an image capturing function. The microphone 234 has a sound collecting function. The camera 233 and the microphone 234 may not be connected to the input/output I/F 220 in a configuration in which the host PC 100 has the image capturing function and the sound collecting function. The monitor 235 displays various screens based on the display data obtained from the input/output I/F 220.

The operation of the printer driver 212 will now be described. Upon receiving a print instruction from the OS 213, the printer driver 212 causes the monitor 235 to display a print setting screen of the printer driver 212. The printer driver 212 stores print setting information input by the user in the RAM 203. The print setting information includes, for example, ON/OFF information about the multiplexing function, additional information, color component information about the encoding pattern, an image processing setting described later, etc. The color component information about the coding pattern indicates a color plane with which the coding pattern is synthesized. The printer driver 212 generates PDL data in accordance with a GDI command provided from the OS 213 and stores the PDL data in the RAM 203.

The generated PDL data is transmitted to the additional information multiplexing apparatus 101 via the network I/F 204.

Next, the additional information multiplexing apparatus 101 in this embodiment will be described.

Figure 3:
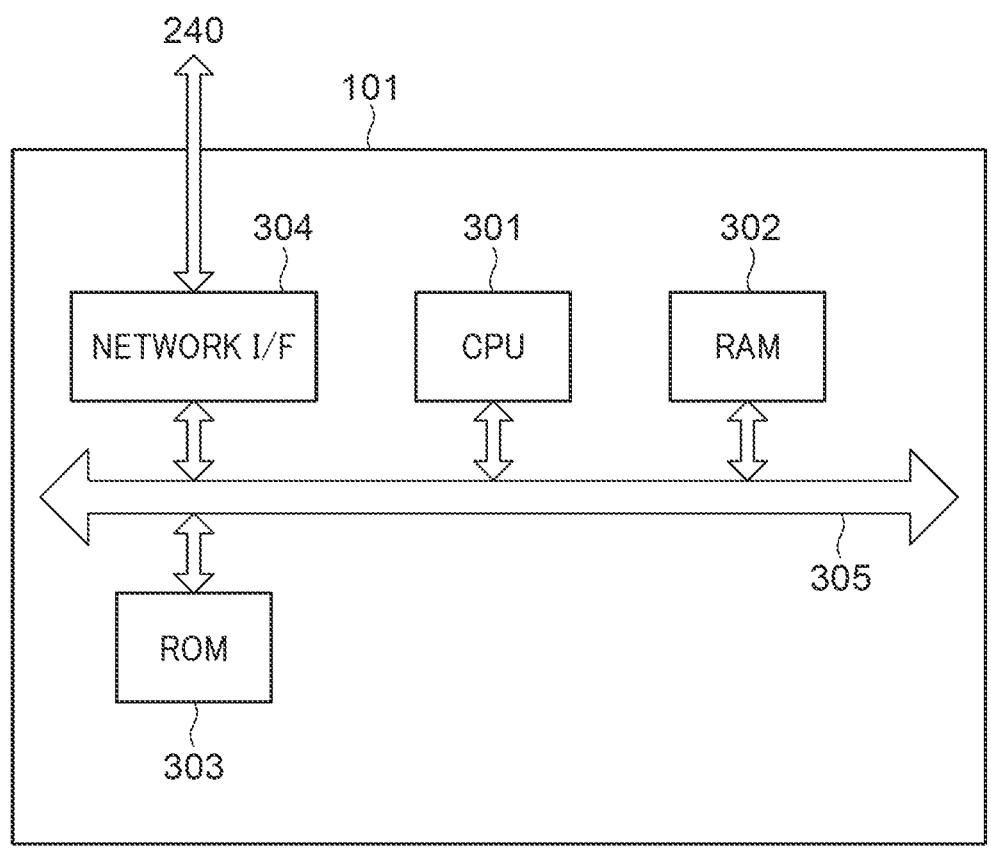
FIG. 3 is a block diagram schematically showing a hardware configuration of an additional information multiplexing apparatus in FIG. 1A.

FIG. 3 is a block diagram schematically showing a hardware configuration of the additional information multiplexing apparatus 101 in FIG. 1. The additional information multiplexing apparatus 101 includes a CPU 301, a RAM 302, a ROM 303, and a network I/F 304. These components are mutually connected via an internal bus 305.

The CPU 301 controls the entire additional information multiplexing apparatus 101. The RAM 302 is used as a work area when the CPU 301 executes various instructions. The ROM 303 stores a program executed by the CPU 301 in activating the additional information multiplexing apparatus 101, setting data of the additional information multiplexing apparatus 101, etc. The network I/F 304 is an interface for data transmission and reception between the additional information multiplexing apparatus 101 and an external apparatus, such as the host PC 100 or the image forming apparatus 102, connected to the network 240. For example, when the additional information multiplexing apparatus 101 receives PDL data from the host PC 100, the additional information multiplexing apparatus 101 stores the PDL data in the RAM 302 and executes a multiplex control process in FIG. 4A and FIG. 4B.

Figure 4B:
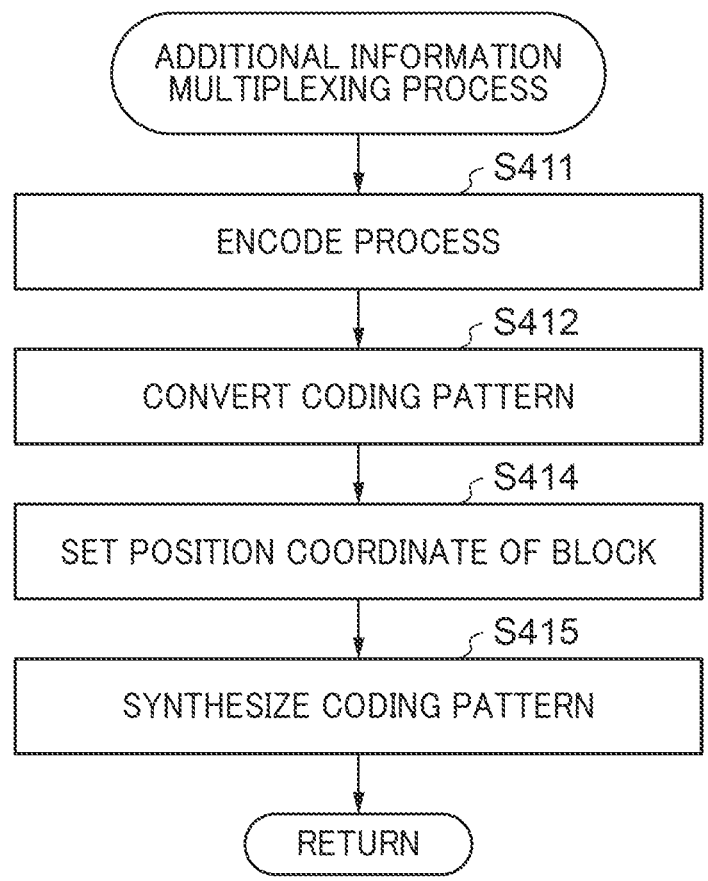

FIG. 4A and FIG. 4B are flowcharts showing the multiplex control process executed in the additional information multiplexing apparatus 101 in FIG. 1. The multiplex control process in FIG. 4A and FIG. 4B is achieved by the CPU 301 executing a program stored in the ROM 303. FIG. 4A shows a procedure of the entire multiplex control process.

As shown in FIG. 4A, the CPU 301 first analyzes the PDL datum read from the RAM 302 (a step S401). The CPU 301 generates image data in a bitmap format and attribute data. The image data in the bitmap format is image data in an RGB color space (hereinafter referred to as "RGB image data"). The attribute data is generated for each pixel based on a type of a drawing command of an object.

The attribute data is determined according to the following criteria. Specifically, attribute data of a pixel in a region designated by a character drawing command (a character type or a character code) is determined as a character attribute. Attribute data of a pixel in a region designated by a line drawing command (a coordinate point, a length, or a thickness) is determined as a line attribute. Attribute data of a pixel in a region designated by a graphic drawing command (a rectangle, a shape, or a coordinate point) is determined as a graphic attribute. Attribute data of a pixel in a region designated by an image drawing command (a group of points) is determined as an image attribute.

The CPU 301 also obtains print setting information from the PDL data and stores the print setting information in the RAM 302. As described above, the print setting information includes the ON/OFF information about the multiplexing function, the additional information, the color component information about the coding pattern, the image processing setting, etc. The image processing setting is, for example, information indicating a halftone pattern used in a halftone process described later. The halftone pattern is, for example, a halftone pattern designated by a user who instructs the host PC 100 to transmit the PDL data or a default halftone pattern.

Next, the CPU 301 performs color space conversion to convert the generated RGB image data into image data in the CMYK color space (hereinafter referred to as "CMYK image data") in a step S402. This color space conversion uses a four dimensional LUT (Look Up Table) capable of converting RGB image data into a CMYK color space capable of forming a desired color (Lab) value on a sheet. The four dimensional LUT may be obtained in advance by an experiment or a simulation, or may be calculated by a calculation formula etc. The CMYK image data obtained in the step S402 is stored in the RAM 302.

Next, the CPU 301 determines whether the multiplexing function is ON based on the ON/OFF information of the multiplexing function included in the print setting information stored in the RAM 302 (a step S403). When it is determined in the step S403 that the multiplexing function is ON, the CPU 301 obtains the additional information from the RAM 302 (a step S404). Next, the CPU 301 performs the additional information multiplexing process in FIG. 4B (a step S405).

FIG. 4B is a flowchart showing a procedure of the additional information multiplexing process in the step S405 in FIG. 4A.

As shown in FIG. 4B, the CPU 301 performs an encode process of the obtained additional information (a step S411). In the encode process, a number or a character indicated by the additional information is converted into binary data represented by only "0" and "1" based on the character code. In the character code, information indicating binary data into which a numeral or a character is converted is defined. Hereinafter, as an example, a case in which the encode process of the additional information "hello" is performed based on "shift JIS" that is a character code will be described. In this case, the additional information "hello" is converted into binary data "0110100001100101011011000110110001101111".

Figure 5A:
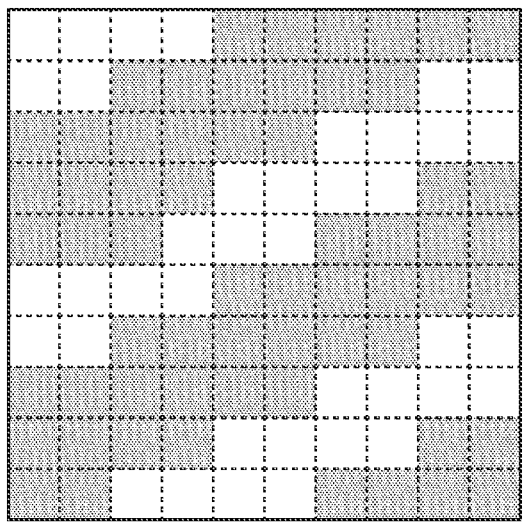
FIG. 5A and FIG. 5B are views showing examples of coding patterns to be synthesized with image data by the additional information multiplexing apparatus in FIG. 1A.
Figure 5B:
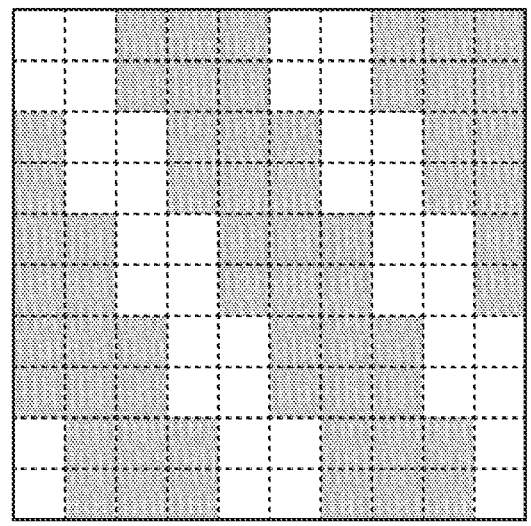

Next, the CPU 301 converts the binary data obtained in the step S411 into a coding pattern for each numerical value ("0" or "1") constituting the binary data (a step S412). A coding pattern to be synthesized with image data will be described with reference to FIG. 5A and FIG. 5B. FIG. 5A shows a coding pattern constituted by 100 pixels (10 px*10 px) corresponding to the numerical value "0". FIG. 5B shows a coding pattern constituted by 100 pixels (10 px*10 px) corresponding to the numerical value "1".

When the coding pattern in FIG. 5A and the coding pattern in FIG. 5B are synthesized with image data, the image data has a different periodicity for each block of 10 px*10 px. A method of synthesizing the coding pattern will be described later. In addition, when a printed matter that is generated by a print process of image data with which such coding patterns are synthesized is read and when an arrangement of the coding patterns having two periodicities can be specified by applying frequency analysis to image data obtained by reading the printed matter, the binary data constituted by "0" and "1" can be read.

Next, the CPU 301 obtains the CMYK image data obtained in the step S402 and the color component information of the coding pattern included in the print setting information from the RAM 302. The CPU 301 sets a position coordinate of a block with which each coding pattern is synthesized to an image of a color plane indicated by the color component information about the coding pattern in the CMYK image data (a step S414). For example, the image size shall be 640 px in a vertical width and 480 px in a horizontal width. The block size is the size of the coding pattern, that is, the vertical width is 10 px and the horizontal width is 10 px. In this case, a vertical block number is 640/10=64 blocks, and a horizontal block number is 480/10=48 blocks. Further, the total block number is 64*48=3072 blocks. In the step S414, for example, a coordinate of an upper left corner of a target block is set as the position coordinate of the block.

The size of the additional information that can be represented will now be described. The additional information multiplexing apparatus 101 multiplexes the same data at a plurality of positions so that the additional information extraction apparatus 103 can extract the additional information even by reading only a part of the printed matter. For example, the same additional information shall be multiplexed at 32 positions. When the block number of the entire image is 3072 blocks as obtained in the step S414, the additional information has a size that can be represented using 3072/32=96 blocks. Since one block is 1 bit information of "0" or "1", the additional information can handle 96-bit information. Eight bits of "11111111", which is not expressed as a character in the shift JIS, are included at a head of characters in order to specify a start position of the 96-bit information. Therefore, data of 96−8=88 bits can be defined as the additional information. In this embodiment, the binary data consisting of "0" and "1" and falling within 88 bits is obtained in the step S411.

In the next step S415, the CPU 301 synthesizes each coding pattern obtained in the step S412 with the CMYK image data obtained in the step S402 at the position coordinate of each block set in the step S414.

Hereinafter, a method of calculating a pixel value in synthesizing a coding pattern will be described using FIG. 6A and FIG. 6B. This embodiment describes a case where a print instruction to synthesize the coding pattern with a Yellow plane (hereinafter, referred to as a "Y-plane") having a high lightness component in the CMYK color space so as to make the coding pattern inconspicuous. FIG. 6A corresponds to the coding pattern in FIG. 5A, and FIG. 6B corresponds to the coding pattern in FIG. 5B. Numerical values in FIG. 6A and FIG. 6B indicate pixel values of yellow to be added to the CMYK image data obtained in the step S402.

For example, when the pixel values in the Y-plane with which the coding patterns in FIG. 6A and FIG. 6B are synthesized are uniformly 20, a pixel value of a pixel of which a numerical value is 0 in FIG. 6A and FIG. 6B becomes 20+0=20, and a pixel value of a pixel of which a numerical value is 72 in FIG. 6A and FIG. 6B becomes 20+72=92. If a pixel value of a block in the Y-plane with which the coding pattern is synthesized is 184 or more, a pixel value of a pixel of which a numerical value is 72 becomes 184+72=256 or more, which exceeds the 8-bit maximum value. In such a case, the pixel value is clipped to 255 that is the 8-bit maximum value. When the coding patterns are synthesized in this way, the image data has a predetermined periodicity by the coding patterns for each block of 10 px*10 px in the Y-plane. The CMYK image data with which the coding patterns are synthesized is stored in the RAM 302, and the multiplex control process ends. Thereafter, the CMYK image data and the image processing setting are transmitted to the image forming apparatus 102.

In the meantime, when it is determined in the step S403 that the multiplexing function is not ON but is OFF, the multiplex control process ends. After that, the CMYK image data and the image processing setting stored in the RAM 302 are transmitted to the image forming apparatus 102.

Although the configuration in which the additional information obtained from the PDL data is converted into the coding pattern and the coding pattern is synthesized with the CMYK image data has been described in this embodiment, the configuration is not limited thereto. For example, the additional information stored in advance in the ROM 303 of the additional information multiplexing apparatus 101, instead of the additional information obtained from the PDL data, may be converted into a coding pattern, and the coded pattern may be synthesized with the CMYK image data.

Next, the image forming apparatus 102 according to this embodiment will be described.

Figure 7:
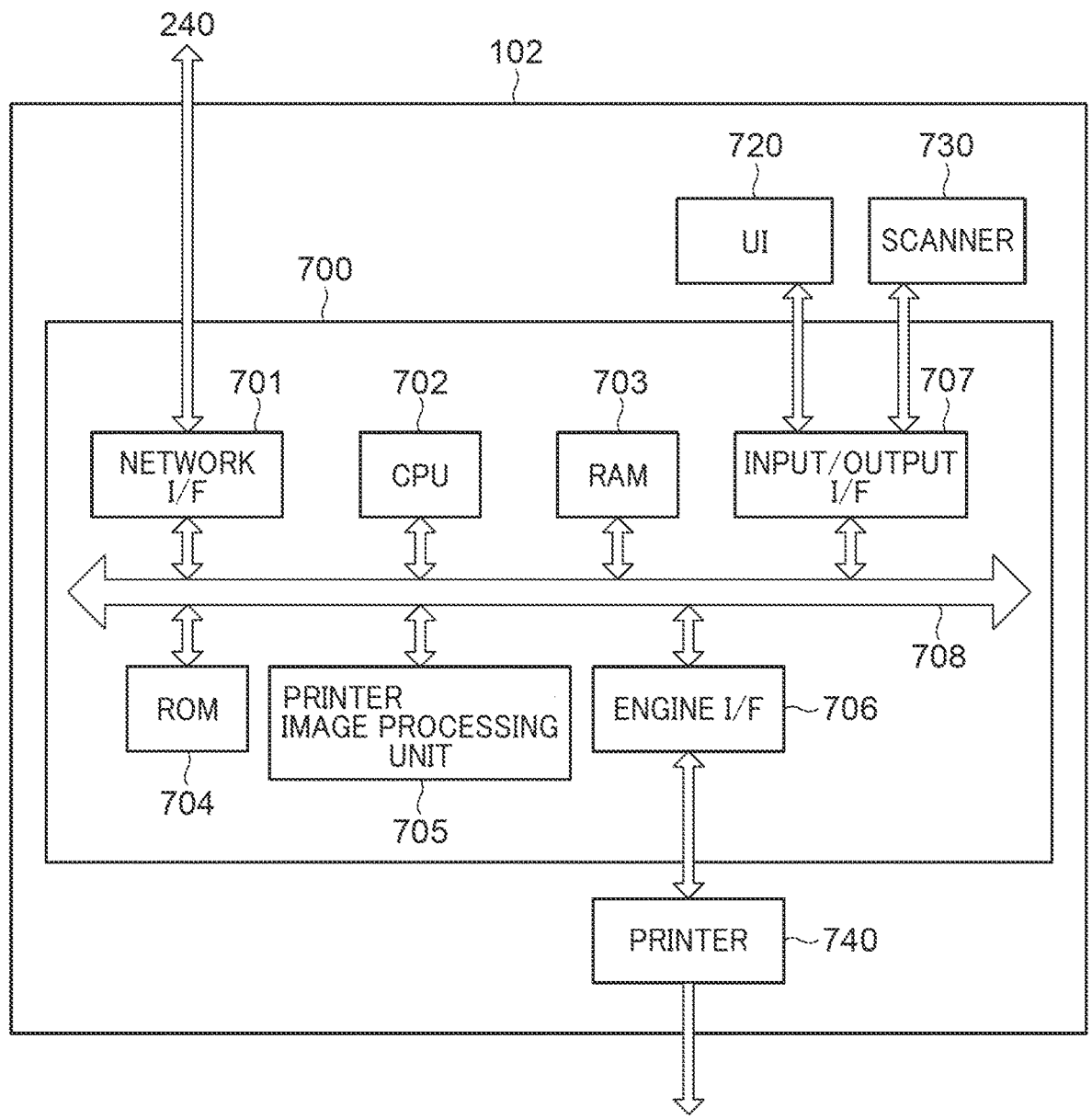
FIG. 7 is a block diagram schematically showing a hardware configuration of an image forming apparatus in FIG. 1A.

FIG. 7 is a block diagram schematically showing a hardware configuration of the image forming apparatus 102 in FIG. 1A. As shown in FIG. 7, the image forming apparatus 102 includes a controller 700, a UI 720, a scanner 730, and a printer 740. The controller 700 is connected to the UI 720, the scanner 730, and the printer 740. Further, the controller 700 includes a network I/F 701, a CPU 702, a RAM 703, a ROM 704, a printer image processing unit 705, an engine I/F 706, and an input/output I/F 707. These components are mutually connected via an internal bus 708.

The network I/F 701 is an interface for data transmission and reception between the image forming apparatus 102 and an external device connected to the network 240, for example, the additional information multiplexing apparatus 101. The CPU 702 controls the entire image forming apparatus 102. The RAM 703 is used as a work area when the CPU 702 executes various instructions. The ROM 704 stores a program executed by the CPU 702 in activating the image forming apparatus 102 and setting information of the controller 700. The printer image processing unit 705 converts image data or document data received from the external device into print data. The engine I/F 706 transfers the print data to the printer 740. The input/output I/F 707 is an interface for data transmission and reception between the controller 700 and the UI 720 or the scanner 730.

The printer 740 prints an image on a sheet based on the print data. The UI 720 is a user interface for a user to instruct the image forming apparatus 102 to select sheet information etc. The scanner 730 reads a printed matter and generates image data of the printed matter.

An overview of the operation of the controller 700 will now be described.

Figure 8A:
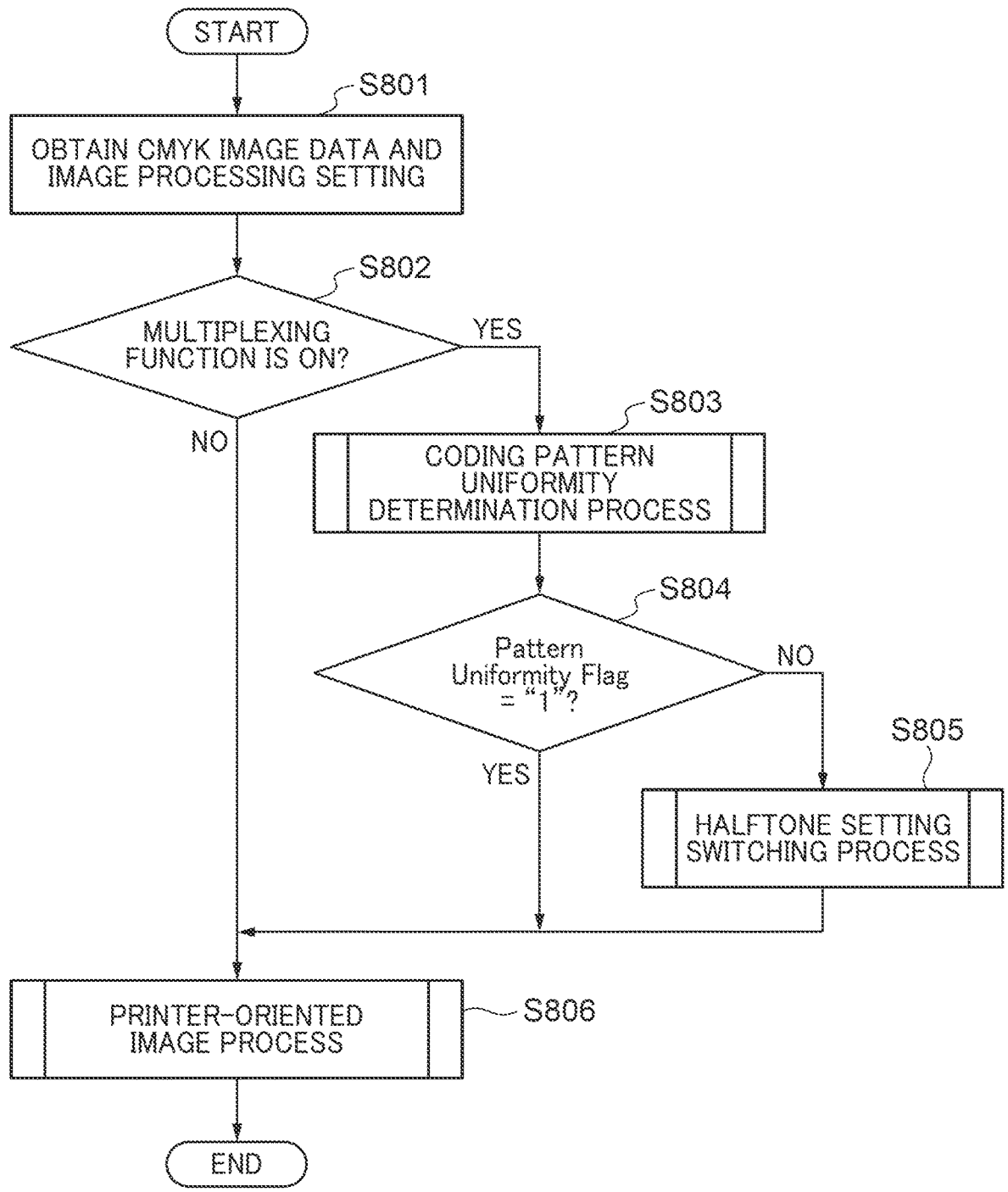

FIG. 8A, FIG. 8B, FIG. 8C, and FIG. 8D are flowcharts showing procedures of a control process performed in the controller 700 in FIG. 7. FIG. 8A shows a procedure of the entire control process. This control process is achieved by the CPU 702 of the controller 700 executing a program stored in the ROM 704. This control process is executed when the additional information multiplexing apparatus 101 executes the multiplex control process to generate CMYK image data and transmits the CMYK image data and the image processing setting to the image forming apparatus 102.

As shown in FIG. 8A, first, the CPU 702 obtains the CMYK image data and the image processing setting from the additional information multiplexing apparatus 101 via the network I/F 701 (a step S801). As described above, the image processing setting is information indicating a halftone pattern used in the halftone process.

A case where the user switches the halftone pattern will now be described. First, candidates for halftone patterns in this embodiment will be described with reference to FIG. 9.

FIG. 9 is a view showing halftone patterns that can be used by the image forming apparatus 102 in FIG. 1A. In FIG. 9, a halftone pattern 1 is a halftone pattern with a low line number, a halftone pattern 2 is a halftone pattern with a high line number, and a halftone pattern 3 is a halftone pattern with a higher line number than the halftone pattern 2. The image forming apparatus 102 can switch between these three halftone patterns. In this embodiment, the halftone pattern 1 is a default halftone pattern with the low line number, and the halftone pattern 2 is a default halftone pattern with the high line number.

Now, in a dither method using a threshold matrix, basically, the number of small dots that constitute the image data after the halftone process increases as the line number increases. For this reason, although a reproducibility of a character of a small point or a low signal value is improved, a reproducibility of a dot itself is not stabilized and a gradation property of an image portion is lowered.

In the meantime, in the dither method using the threshold matrix, the number of large dots that constitute the image data after the halftone process decreases as the line number decreases. For this reason, although the reproducibility of a character of a small point or a low signal value is lowered (jaggy feeling increases), the reproducibility of the dot itself is stabilized and the gradation property of an image portion is improved. As described above, there is a trade-off relationship between the reproducibility of a character having a small point or a low signal value and the reproducibility of a dot itself. The image forming apparatus 102 obtains the attribute data obtained in the step S401 from the additional information multiplexing apparatus 101 and performs the halftone process based on the attribute data. For example, the image forming apparatus 102 applies the halftone process by the dither method using the threshold matrix with the low line number to a region having an image attribute in image data. In addition, the image forming apparatus 102 applies the halftone process by the dither method using the threshold matrix with the large line number to a region having the character attribute, a region having the line attribute, and a region having the graphic attribute in the image data. By controlling the halftone process in accordance with the attribute in this way, the trade-off relationship concerning the line number is eliminated, and it is possible to output a printed matter with a good image quality for each attribute.

For example, the user may select the halftone pattern 2 with the higher line number than the halftone pattern 1 as the default halftone pattern for the image portion due to anxiety about the jaggy feeling rather than the gradation property. Assuming such a user's request, the image forming apparatus 102 holds a plurality of halftone patterns. In the following description, in order to simplify the description, a case where the halftone pattern is not switched for each attribute and only the default halftone pattern with the low line number is used will be described. In other words, in this embodiment, the halftone pattern 1 that is the default halftone pattern with the low line number shall be set as the halftone pattern used in the halftone process.

Returning to the description of FIG. 8A, the CPU 702 obtains the ON/OFF information about the multiplexing function from the additional information multiplexing apparatus 101 via the network I/F 701. Next, the CPU 702 determines whether the multiplexing function is ON based on the obtained ON/OFF information about the multiplexing function (a step S802). When it is determined in the step S802 that the multiplexing function is not ON but OFF, the process proceeds to a step S806 described later. If it is determined in the step S802 that the multiplexing function is ON, the CPU 702 performs a coding pattern uniformity determination process in FIG. 8B (a step S803).

When the halftone process is performed to the image data with which the coding pattern is synthesized, the coding pattern may not be reproduced uniformly. Here, a case where the coding pattern cannot be uniformly reproduced will be described with reference to FIG. 10A, FIG. 10B, and FIG. 10C.

FIG. 10A shows an example in which the coding patterns in FIG. 5A and FIG. 5B are synthesized with the Y plane of the CMYK image data. FIG. 10B shows a matrix of thresholds for yellow in the halftone pattern 1. FIG. 10C shows a result obtained by performing the halftone process to the image data in FIG. 10A using the threshold matrix in FIG. 10B.

In FIG. 10A, there are areas 1001 and 1004 in which the coding pattern in FIG. 5A is synthesized with signal value 72, and areas 1002 and 1003 in which the coding pattern in FIG. 5B is synthesized with signal value 72. The halftone process is performed to the image data with which the coding patterns are synthesized using the yellow threshold matrix of the halftone pattern 1 shown in FIG. 10B. For the Y plane of the halftone pattern 1, the line screen of 134 lpi (lines per inch) and 117 deg (degrees) shown in FIG. 9 is used as default. As a result of the above-mentioned halftone process, the image data shown in FIG. 10A becomes a binary image shown in FIG. 10C.

Since dots corresponding to the coding pattern are present even if binary data is obtained by the halftone process in areas 1006 and 1007 in FIG. 10C, the periodicity of the coding pattern can be maintained on a sheet even if the data is printed as-is. In the meantime, since the dots corresponding to the coding pattern disappear due to the halftone process in areas 1005 and 1008 in FIG. 10C, the additional information cannot be extracted from the printed matter obtained by printing such image data. This is because the angle of the coding pattern coincides with the screen angle of the Y plane of the halftone pattern 1 used in the halftone process, and binary dots are not formed due to the threshold arrangement or the initial phase of the screen matrix. Specifically, the gray dots in the areas 1001 and 1004 are compared with only high thresholds in the screen matrix in FIG. 10B, and as a result, binary dots are not formed. In this way, when the angle of the coding pattern coincides with the screen angle of the color plane with which the coding pattern is synthesized in the halftone pattern used in the halftone process, the coding pattern cannot be uniformly reproduced.

In contrast, the coding pattern uniformity determination process in the step S803 is performed in this embodiment.

FIG. 8B is a flowchart showing a procedure of the coding pattern uniformity determination process in the step S803 in FIG. 8A.

As shown in FIG. 8B, the CPU 702 obtains the color component information about the coding pattern from the additional information multiplexing apparatus 101 via the network I/F 701 (a step S811). The color component information about the coding pattern indicates a color plane in which the coding pattern is synthesized in the CMYK image data. In this embodiment, information indicating the Y-plane is obtained in the step S811.

Figure 11:
FIG. 11 is a view showing an example of a coding pattern uniformity table generated in a step S812 in FIG. 8B.

The CPU 702 then generates a coding pattern uniformity table 1101 shown in FIG. 11 (the step S812). The coding pattern uniformity table 1101 is generated based on a result of comparison between the screen angle of each color plane in the halftone patterns 1 to 3 and the angle of the coding pattern synthesized with the CMYK image data. The coding pattern uniformity table 1101 includes a uniformity reproducibility property for each of cyan, magenta, yellow, and black of each of the halftone patterns 1 to 3. The uniformity reproducibility property is information indicating whether all the coding patterns synthesized with the CMYK image data can be reproduced uniformly (OK) or not (NG). In FIG.

11, for example, the uniformity reproducibility properties of cyan and yellow in the halftone pattern 1, magenta in the halftone pattern 2, and magenta in the halftone pattern 3 are "NG". These indicate that the coding patterns cannot be uniformly reproduced in cyan and yellow in the halftone pattern 1, magenta in the halftone pattern 2, and magenta in the halftone pattern 3. In the coding pattern uniformity table 1101, "NG" may be set as the uniformity reproducibility property of a color plane whose angle does not completely coincide with the angle of the coding pattern synthesized with the CMYK image data but substantially coincides with the angle.

Next, the CPU 702 obtains, from the coding pattern uniformity table 1101, the uniformity reproducibility property corresponding to the color plane indicated by the color component information about the coding pattern in the halftone pattern 1 obtained in the step S811. The CPU 702 determines whether the obtained uniformity reproducibility property is "OK" (a step S813). When it is determined in the step S813 that the obtained uniformity reproducibility property "OK", the process proceeds to a step S814. When it is determined in the step S813 that the obtained uniformity reproducibility property is not "OK" but "NG", the process proceeds to a step S815.

In the step S814, the CPU 702 outputs "Pattern Uniformity Flag=1" as a flag indicating that it is determined that the coding pattern synthesized with the CMYK image data can be uniformly reproduced. Thereafter, the coding pattern uniformity determination process ends, and the process proceeds to a step S804.

In the step S815, the CPU 702 outputs "Pattern Uniformity Flag=0" as a flag indicating that it is determined that the coding pattern synthesized with the CMYK image data cannot be uniformly reproduced. Thereafter, the coding pattern uniformity determination process ends, and the process proceeds to the step S804.

In the step S804, the CPU 702 determines whether the Pattern Uniformity Flag is "1". When it is determined in the step S804 that the Pattern Uniformity Flag is "1", the process proceeds to a step S806. When it is determined in the step S804 that the Pattern Uniformity Flag is not "1" but "0", the process proceeds to a step S805.

Figure 8C:
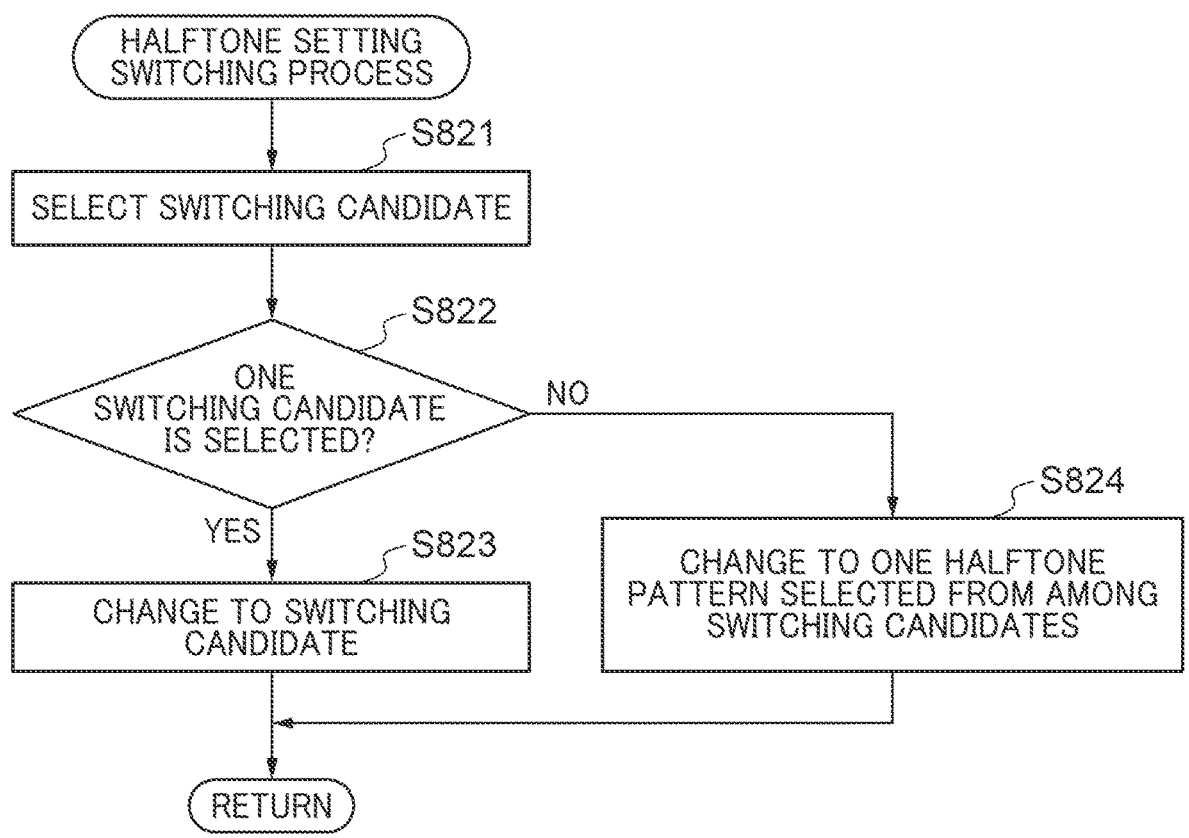

In the step S805, the CPU 702 performs a halftone setting switching process shown in FIG. 8C.

FIG. 8C is a flowchart showing a procedure of the halftone setting switching process in the step S805 in FIG. 8A.

In FIG. 8C, the CPU 702 selects a halftone pattern to be a switching candidate from the coding pattern uniformity table 1101 (a step S821). In step S821, in the coding pattern uniformity table 1101, halftone patterns in which the uniformity reproducibility properties of the Y-plane, which is a color plane synthesized with the coding pattern, are "OK", i.e., the halftone patterns 2 and 3, are selected as switching candidates. Next, the CPU 702 determines whether one switching candidate is selected (a step S822).

When it is determined in the step S822 that one switching candidate has been selected, the CPU 702 changes the halftone pattern used in the halftone process from the halftone pattern 1 to the switching candidate selected in the step S821 (a step S823). When the process in the step S823 is completed, the halftone setting switching process ends, and the process proceeds to the step S806 in FIG. 8A.

When it is determined in the step S822 that the plurality of switching candidates are selected, the process proceeds to a step S824. In the step 824, the CPU 702 changes the halftone pattern used in the halftone process from the halftone pattern 1 to one halftone pattern selected from the switching candidates.

In the step S824, for example, the halftone pattern having the highest line number is selected from among the switching candidates. This improves reproducibility of a character of a small point or a low signal value. In this embodiment, the selection of the halftone pattern to be switched is not limited to this configuration. For example, the switching candidates may be displayed on the UI 720, and the halftone pattern 1 may be switched to a halftone pattern designated by the user on the UI 720 in the step S824. In addition, priorities may be set to the halftone patterns 1 to 3 in advance by the user, and the halftone pattern having the highest priority may be selected from the switching candidates. This enables generation of the image data in which the coding pattern is uniformly reproduced while performing the halftone process using a halftone pattern desired by the user. When the process in the step S824 is completed, the halftone setting switching process ends, and the process proceeds to the step S806 in FIG. 8A.

Figure 8D:
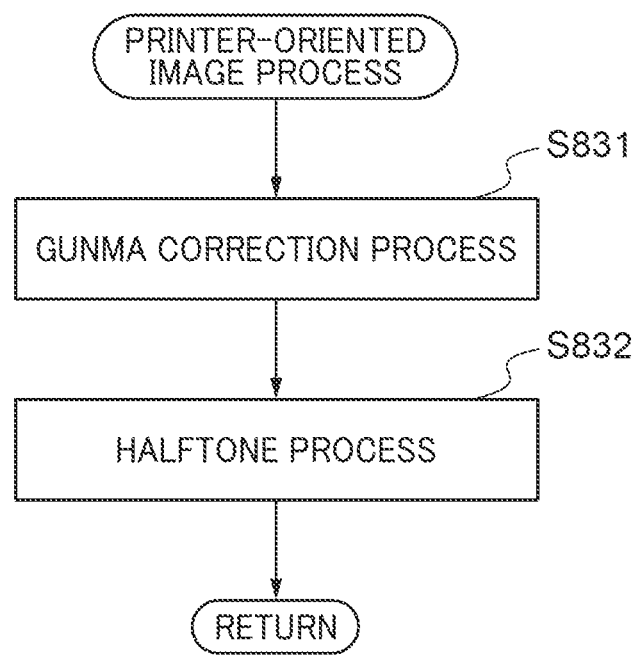

In the step S806, the CPU 702 performs a printer-oriented image process shown in FIG. 8D.

FIG. 8D is a flowchart showing a procedure of the printer-oriented image process in the step S806 in FIG. 8A.

In FIG. 8D, the CPU 702 performs a gamma correction process to the CMYK image data obtained in the step S801 (a step S831). This gamma correction process is performed using a one dimensional LUT so that an image data obtained by the halftone process in a step S832 described later will have a desired density characteristic in transferring to a recording sheet. The image data that has been subjected to the gamma correction process is stored in the RAM 703.

Next, the CPU 702 applies the halftone process to the image data that has been subjected to the gamma correction process stored in the RAM 703 (a step S832). This halftone process uses the halftone pattern set until the step S806. That is, when the coding pattern is synthesized, a halftone pattern capable of uniformly reproducing the coding pattern is used. The image data that has been subjected to the halftone process is stored in the RAM 703, and the control process ends. Thereafter, the printer 740 prints the image data that has been subjected to the halftone process stored in the RAM 703 on a sheet. Thus, a printed matter is generated. For example, when the multiplexing function is ON, a printed matter on which additional information is multiplexed is generated.

Although the configuration in which the image forming apparatus 102 generates the coding pattern uniformity table 1101 in the step S812 has been described in this embodiment, the present invention is not limited to this configuration. For example, another device, such as the host PC 100 or the additional information multiplexing apparatus 101, may generate the coding pattern uniformity table 1101. In such a configuration, the image forming apparatus 102 obtains the coding pattern uniformity table 1101 from the other apparatus in the step S812 and performs the process in the step S813 using the obtained coding pattern uniformity table 1101.

Next, the additional information extraction apparatus 103 in this embodiment will be described.

Figure 12:
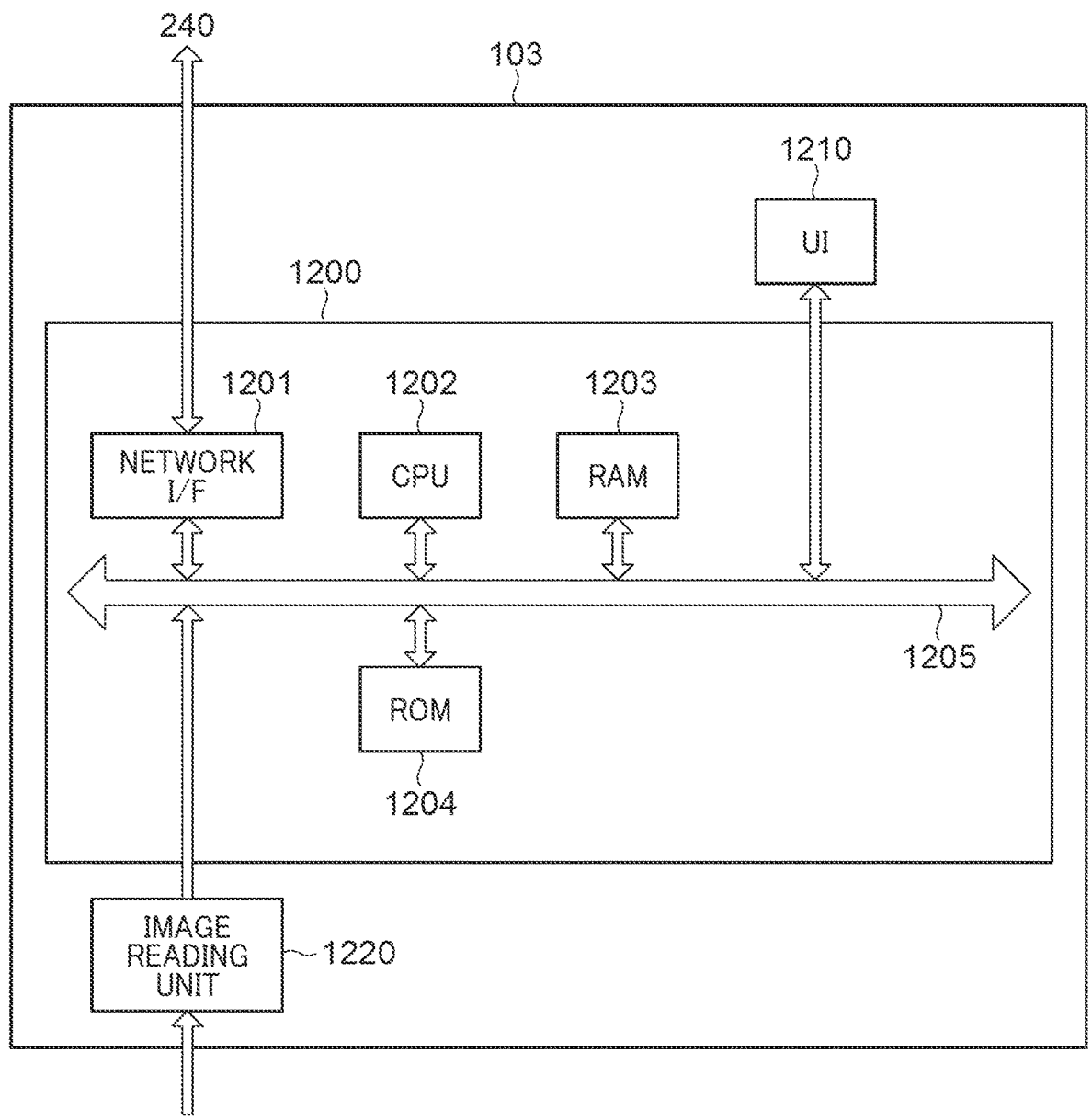
FIG. 12 is a block diagram schematically showing a hardware configuration of an additional information extraction apparatus in FIG. 1B.

FIG. 12 is a block diagram schematically showing a hardware configuration of the additional information extraction apparatus 103 in FIG. 1B. In FIG. 12, the additional information extraction apparatus 103 includes an additional information extraction controller 1200, a UI 1210, and an image reading unit 1220. The additional information extraction controller 1200 is connected to the UI 1210 and the image reading unit 1220. The additional information extraction controller 1200 includes a network I/F 1201, a CPU 1202, a RAM 1203, and a ROM 1204. These components are mutually connected via an internal bus 1205.

The additional information extraction controller 1200 extracts the additional information from the scan image data generated by the image reading unit 1220 reading the printed matter. The network I/F 1201 is an interface for the additional information extraction apparatus 103 to perform data transmission and reception with the external device connected to the network 240. The CPU 1202 controls the entire additional information extraction apparatus 103. The RAM 1203 is used as a work area when the CPU 1202 executes various instructions. The ROM 1204 stores a program executed by the CPU 1202 in activating the additional information extraction apparatus 103 and setting data of the additional information extraction controller 1200, etc. The UI 1210 is a user interface for the user to operate the additional information extraction apparatus 103. The image reading unit 1220 has a scanning function. For example, when the user inputs an instruction to the UI 1210 to read the additional information multiplexed on the printed matter, the image reading unit 1220 reads the set printed matter and generates the scan image data of the printed matter. The generated scan image data is stored in the RAM 1203, and the additional information extraction process in FIG. 13 is executed.

Figure 13:
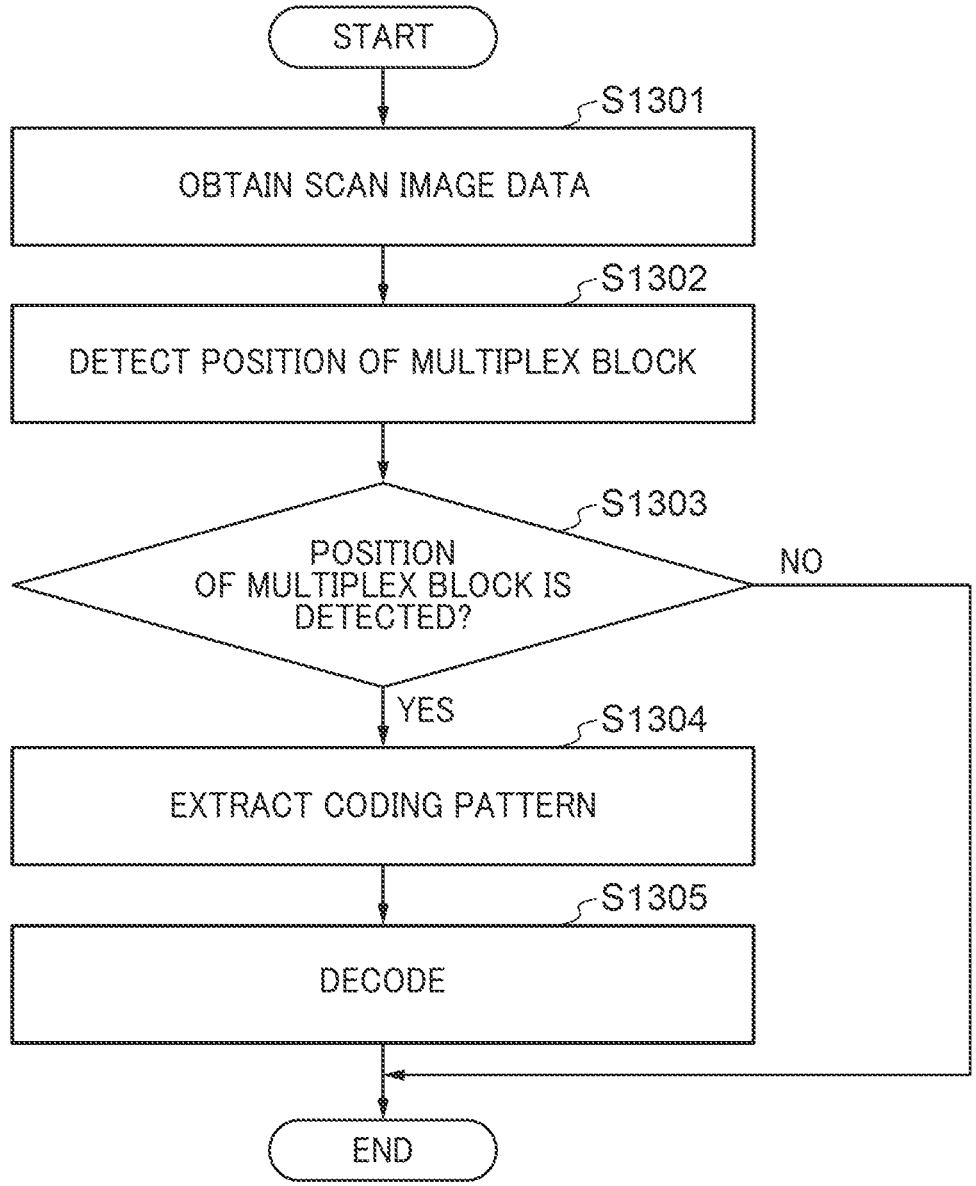
FIG. 13 is a flowchart showing a procedure of an additional information extraction process performed in the additional information extraction apparatus in FIG. 1B.

FIG. 13 is a flowchart showing a procedure of the additional information extraction process performed in the additional information extraction apparatus 103 in FIG. 1B. This additional information extraction process is achieved by the CPU 1202 executing a program stored in the ROM 1204.

In FIG. 13, the CPU 1202 obtains the scan image data generated by the image reading unit 1220 from the RAM 1203 (a step S1301). Next, the CPU 1202 detects the position of the multiplex block corresponding to the block of the coding pattern synthesized with the obtained scan image (a step S1302). Hereinafter, a method of detecting the position of the multiplex block will be described with reference to FIG. 14, FIG. 15A, FIG. 15B, FIG. 16A, and FIG. 16B.

FIG. 14 is a schematic view showing difference in frequency characteristics in a two-dimensional frequency domain in the Y-plane in this embodiment. The horizontal axis represents the frequency in the horizontal direction, and the vertical axis represents the frequency in the vertical direction. An origin at the center indicates a DC component, and the frequency becomes higher as the distance from the origin increases.

In FIG. 14, areas where powers of frequency components of 117 deg and 297 deg appear are indicated by a straight line 1401, and areas where powers of frequency components of 27 deg and 206 deg appear are indicated by a straight line 1402. An area in which a power of a frequency component of 134 lpi appears is indicated by a circular line 1403. That is, an intersection point 1411 between the straight line 1401 and the circular line 1403 indicates a position where a power of a frequency component of 134 lpi and 117 deg appears, and an intersection point 1412 between the straight line 1401 and the circular line 1403 indicates a position where a power of a frequency component of 134 lpi and 297 deg appears. Further, an intersection point 1413 between the straight line 1402 and the circular line 1403 indicates a position where a power of a frequency component of 134 lpi and 27 deg appears, and an intersection point 1414 between the straight line 1402 and the circular line 1403 indicates a position where a power of a frequency component of 134 lpi and 206 deg appears.

For example, when the frequency component of the coding pattern in FIG. 5A is indicated by 134 lpi and 117 deg, a large power spectrum occurs at the intersection point 1411. In addition, when the frequency component of the coding pattern in FIG. 5B is indicated by 134 lpi and 27 deg, a large power spectrum occurs at the intersection point 1413. By detecting a portion where a power spectrum equal to or greater than a certain threshold is generated in this way, it is possible to determine which coding pattern is synthesized.

For example, when the halftone pattern is changed to 300 lpi and 0 deg that can uniformly reproduces the coding pattern in the above-described step S805, the frequency component of the Y-plane generated by the halftone process appears at a point 1415. The halftone pattern of 300 lpi and 0 deg can uniformly reproduce the coding patterns in FIG. 5A and FIG. 5B. Therefore, when the scan image data in which these coding patterns are uniformly reproduced are subjected to frequency analysis, large power spectra appear at intersection points 1411 and 1413. In the meantime, when a halftone pattern that cannot uniformly reproduce a coding pattern, for example, a halftone pattern of 134 lpi and 117 deg is used as-is, the coding pattern in FIG. 5A disappears as shown in FIG. 11C. Therefore, a large power spectrum that should appears at the intersection point 1411 no longer appears, and the coding pattern cannot be detected.

FIG. 15A and FIG. 15B show examples of high pass filters (HPF) having particular frequency-vector directionalities. The HPFs shown in FIG. 15A and FIG. 15B are also used as spatial filters in detecting a frequency vector. That is, the spatial filter shown in FIG. 15A can emphasize a frequency vector on the straight line 1401, and the spatial filter shown in FIG. 15B can emphasize a frequency vector on the straight line 1402.

As an example, a case where a large power spectrum occurs on the frequency vector of the straight line 1401 in FIG. 14 due to the coding pattern in FIG. 5A will be described. In this case, although the spatial filter in FIG. 15A amplifies a change amount of the power spectrum, the spatial filter in FIG. 15B hardly amplifies the change amount of the power spectrum. That is, when filtering is performed by a plurality of spatial filters in parallel, only a spatial filter matching the frequency vector amplifies the change amount, and another spatial filter hardly amplifies the change amount. Therefore, it is possible to easily determine on which frequency vector a large power spectrum occurs.

The coding pattern can be extracted by determining the frequency characteristic as described above. However, if a position to be extracted is shifted in determining the frequency characteristic, the coding pattern cannot be correctly extracted. Therefore, in this embodiment, the position of the multiplex block in the obtained scan image is detected in the step S1302.

Figure 16A:
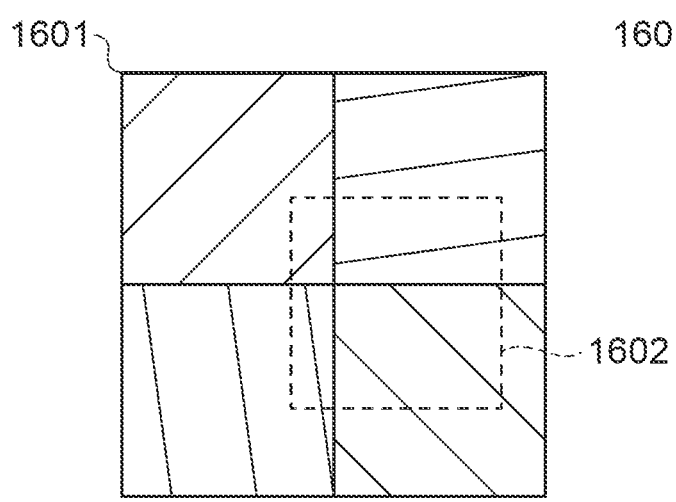
FIG. 16A and FIG. 16B are views for describing detection of a multiplex block in a step S1302 in FIG. 13.
Figure 16B:
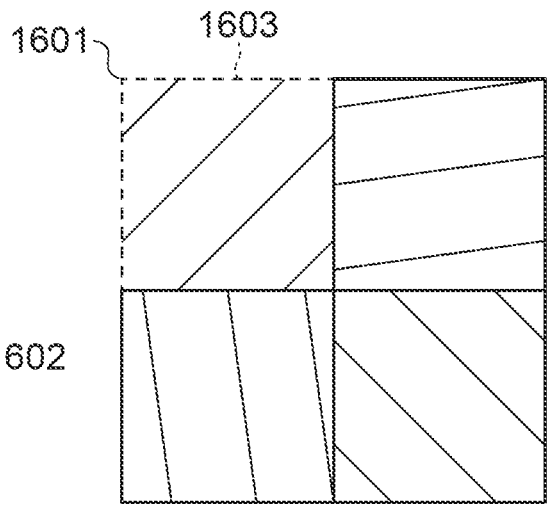

FIG. 16A and FIG. 16B are views for describing detection of a multiplex block in the step S1302 in FIG. 13. An image 1601 indicates a partial image of a scan image, specifically, an image formed by blocks of four coding patterns. Regions 1602 and 1603 indicate determination target regions of the frequency characteristic. FIG. 16A shows a state in which the determination target region 1602 is shifted from the positions of the blocks of the coding patterns. FIG. 16B shows a state in which the determination target region 1603 coincides with the position of the block of the coding pattern. When the determination target region 1603 coincides with the position of the block of the coding pattern as shown in FIG. 16B, the predetermined frequency can be correctly specified. In the meantime, when the determination target region 1602 is shifted from the positions of the blocks of the coding patterns as shown in FIG. 16A, the power spectrum of the specific frequency vector is lowered, so that it is difficult to specify the predetermined frequency. The CPU 1202 detects the position of the multiplex block corresponding to the block of the coding pattern based on whether the power spectrum of the specific frequency vector is strong or weak. Therefore, the CPU 1202 detects the multiplex block by determining the frequency characteristic of the obtained scan image data while shifting the position of the block. The multiplex block detection method has been described above.

Referring back to FIG. 13, the CPU 1202 determines whether the position of the multiplex block is detected (a step S1303). When it is determined in the step S1303 that the position of the multiplex block is not detected, the additional information extraction process is terminated. When it is determined in the step S1303 that the position of the multiplex block is detected, the CPU 1202 extracts the synthesized coding pattern by using the frequency-characteristic determination result with reference to the detected position (a step S1304).

Figure 17:
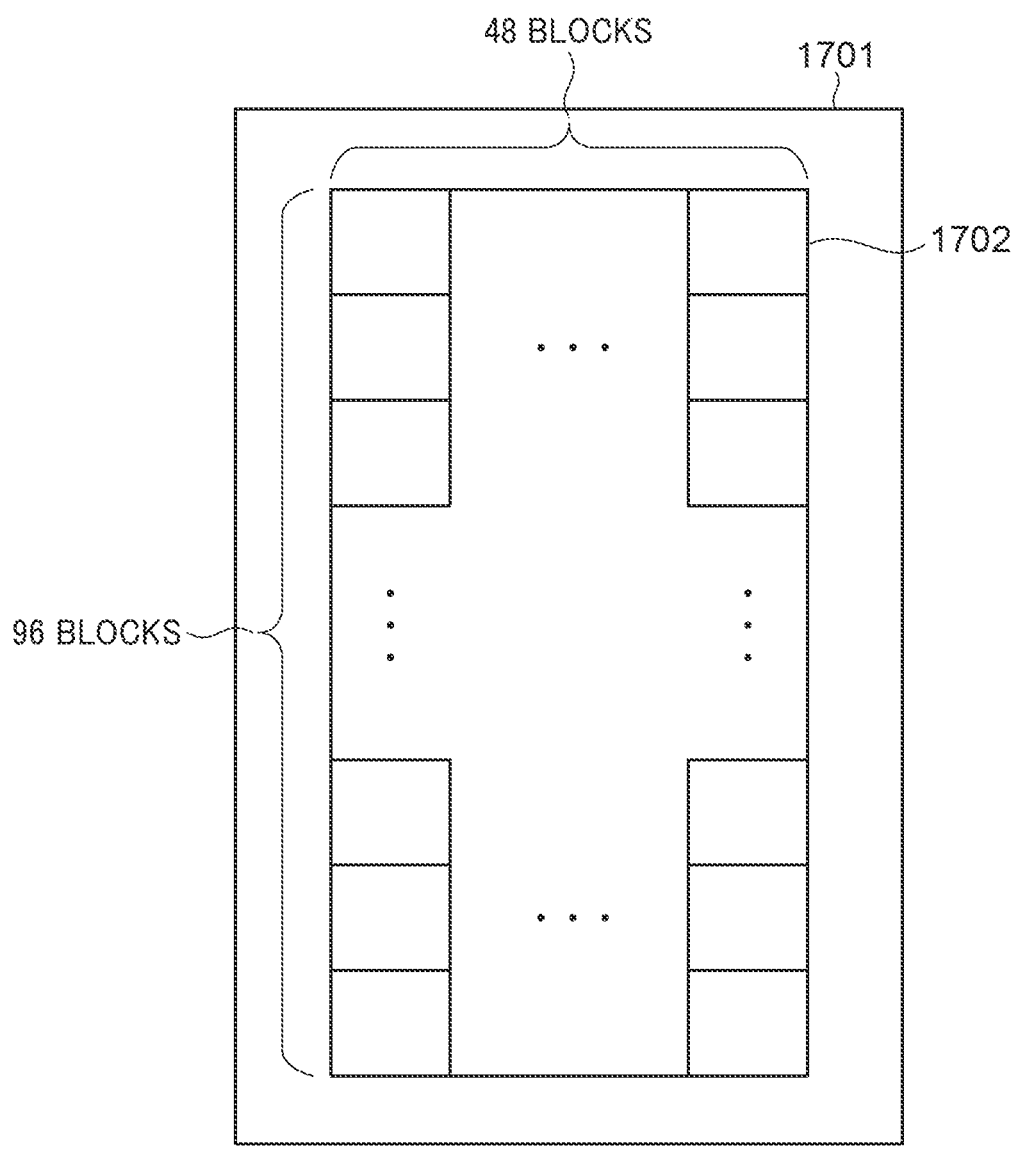
FIG. 17 is a view showing an example of a printed matter on which additional information is multiplexed.

FIG. 17 is a view showing an example of a printed matter 1701 on which additional information is multiplexed. In FIG. 17, a block 1702 represents a multiplex block. There are 48 multiplex blocks on a line in the horizontal direction and 96 multiplex blocks on a line in the vertical direction, i.e., there are 3072 multiplex blocks in total. In FIG. 17, the additional information is encoded into "0" and "1" for each block and is synthesized as a coding pattern. In the step S1304, the frequency characteristic is determined on a block-by-block basis with reference to the position detected in the step S1302 while shifting the target block for 3072 blocks. In this case, since one coding pattern can be determined for each block, (96 bits×32 pieces) bits of data can be extracted in total. As described above, all the coding patterns can be extracted by determining the frequency characteristics while shifting the target block. However, since 32 pieces of the same data are synthesized as described above in this embodiment, the size of the additional information itself becomes 88 bits except for "11111111" representing the start.

The CPU 1202 then analyzes and decodes the extracted coding pattern back into the form of the additional information (a step S1305). Specifically, the CPU 1202 converts the plurality of extracted coding patterns into binary data represented by binary numbers, and decodes the binary data into the original additional information based on the character codes. An author can be identified by comparing the decoded additional information with correct answer data in an external server, for example. When the process in the step S1305 is completed, the additional information extraction process ends.

According to the above-described embodiment, when it is determined that the coding pattern cannot be uniformly reproduced, the halftone pattern used in the halftone process is changed to another halftone pattern. The other halftone pattern is a halftone pattern determined to be capable of uniformly reproducing the coding pattern in the color plane with which the coding pattern is synthesized when used in the halftone process. Thus, an appropriate halftone pattern can be selected in accordance with the color component of the coding pattern to be synthesized.

Also, in the above-described embodiment, the other halftone pattern is a halftone pattern in which the screen angle of the color plane with which the coding pattern is synthesized does not match the angle of the coding pattern. Thus, it is possible to select a halftone pattern capable of uniformly reproducing the coding pattern in accordance with the color component of the coding pattern to be synthesized.

In addition, the image processing apparatus 102 according to this embodiment performs the halftone process using the set halftone pattern and prints a printed matter on which the additional information is multiplexed. Thus, an appropriate halftone pattern can be selected in accordance with the color component of the coding pattern to be synthesized in performing the halftone process.

Although the configuration in which the additional information multiplexing apparatus 101 synthesizes the code pattern and the additional information extraction apparatus 103 extracts the additional information has been described in the above-described embodiment, the configuration is not limited thereto. For example, the image forming apparatus 102 may synthesize the coding pattern and also extract the additional information. In a configuration in which the image forming apparatus 102 synthesizes the coding pattern and extracts the additional information, the host PC 100 transmits the PDL data to the image forming apparatus 102, and the image forming apparatus 102 encodes the additional information and performs the print process of the image data synthesized with the coding pattern. At this time, the image forming apparatus 102 performs the coding pattern uniformity determination process and the halftone setting switching process. In the extraction of the additional information, the scanner 730 of the image forming apparatus 102 reads a printed matter and generates scan image data of the printed matter, and the image forming apparatus 102 performs the above-described additional information extraction process based on the scan image data.

In addition, in this embodiment, in a case where the host PC 100 holds information about a coding pattern and information about a halftone pattern, the host PC 100 may execute the above-described coding pattern uniformity determination process and the halftone setting switching process.

Figure 18:
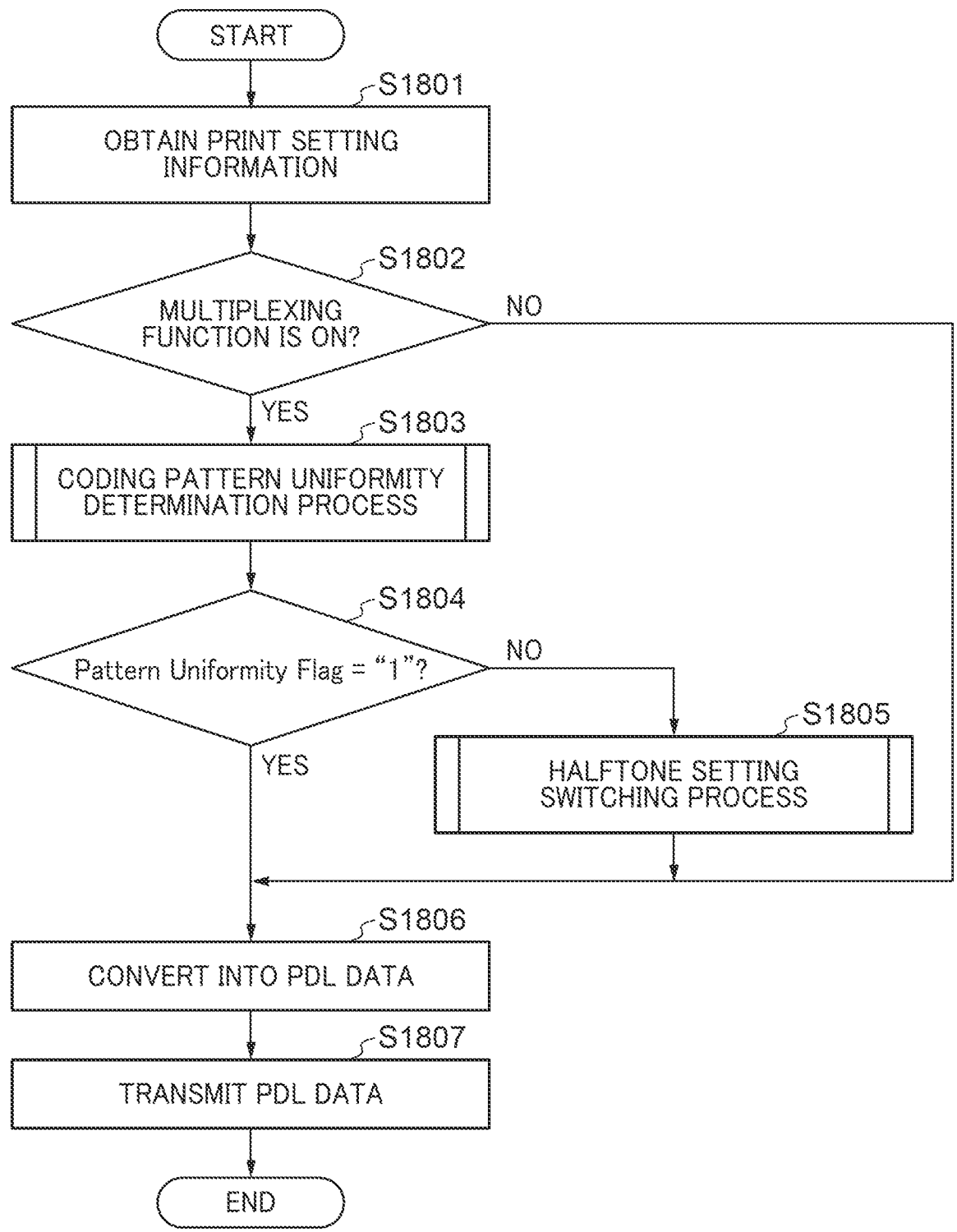
FIG. 18 is a flowchart showing a procedure of a PDL data transmission process performed in the host PC in FIG. 1A.

FIG. 18 is a flowchart showing a procedure of a PDL data transmission process performed in the host PC 100 in FIG. 1A. The PDL data transmission process is achieved by the CPU 201 executing a program stored in the ROM 202. The PDL data transmission process is executed when the host PC 100 receives an image/document print instruction from a user.

In FIG. 18, first, the CPU 201 obtains print setting information input as the print instruction by the user using the keyboard 231 (a step S1801). As described above, the print setting information includes the ON/OFF information about the multiplexing function, the additional information, the color component information about the coding pattern, an image processing setting, etc.

Next, the CPU 201 determines whether the multiplexing function is set to ON based on the obtained print setting information (a step S1802). When it is determined in the step S1802 that the multiplexing function is not ON but is OFF, the process proceeds to a step S1806 described later. When it is determined in the step S1802 that the multiplexing function is set to ON, the process proceeds to a step S1803.

In the step S1803, the CPU 201 performs the coding pattern uniformity determination process. The coding pattern uniformity determination process in the step S1803 is the same process as the coding pattern uniformity determination process in the step S803. The host PC 100 obtains the information used in the coding pattern uniformity determination process, specifically, the information indicating the halftone patterns usable by the image forming apparatus 102 shown in FIG. 9, from the image forming apparatus 102 via the network 240. Alternatively, the information is obtained in installing the printer driver.

The CPU 201 then determines whether the Pattern Uniformity Flag is "1" (a step S1804). When it is determined in the step S1804 that the Pattern Uniformity Flag is "1", the process proceeds to a step S1806 described later. When it is determined in the step S1804 that the Pattern Uniformity Flag is not "1" but "0", the process proceeds to a step S1805.

In the step S1805, the CPU 201 performs the halftone setting switching process. The halftone setting switching process in the step S1805 is the same process as the halftone setting switching process in the step S805. The CPU 201 then converts the image data and the image processing setting into PDL data (the step S1806). Here, the image processing setting includes information indicating a halftone pattern used in the halftone process. When the multiplexing function is ON, this halftone pattern is changed to a halftone pattern capable of uniformly reproducing the coding pattern in the step S1805. Next, the CPU 201 transmits the PDL data to the additional information multiplexing apparatus 101 via the network 240 (a step S1807) and terminates this process.

As described above, the image processing apparatus according to this embodiment is the host PC 100 (an information processing apparatus) that generates PDL data for causing the image forming apparatus to print a printed matter in which additional information is embedded. Accordingly, it is possible to generate PDL data in which an appropriate halftone pattern is designated in accordance with a color component of a coding pattern to be synthesized.

Although the configuration in which a halftone pattern used in the halftone process is changed to another halftone pattern when it is determined that the coding pattern cannot be uniformly reproduced has been described in this embodiment, the configuration is not limited thereto. For example, the color plane with which the coding pattern is synthesized may be changed to another color plane that is a color plane in the same halftone pattern and that is determined to be capable of uniformly reproducing the coding pattern when used in the halftone process. As an example, a case where the halftone pattern 1 is set to be used in the halftone process and the coding pattern is synthesized with the yellow plane will be described. In this case, the color plane with which the coding pattern is synthesized is changed to a magenta plane, which is a color plane determined to be capable of uniformly reproducing the coding pattern used in the halftone process with the halftone pattern 1, based on the coding pattern uniformity table 1101. Thus, even if the halftone process is applied to the image data with which the coding pattern is synthesized, the coding pattern can be uniformly reproduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-144605, filed Sep. 12, 2022, which is hereby incorporated by reference herein in its entirety.

What is claimed is:

1. An image processing apparatus comprising:
   a setting unit configured to set, from among a plurality of halftone patterns, a halftone pattern used in a halftone process to be performed for an image with which a coding pattern is visually synthesized;
   a determination unit configured to determine whether the coding pattern can be uniformly kept after the halftone process is performed using the halftone pattern set by the setting unit; and
   a changing unit configured to change a halftone pattern used in the halftone process to another halftone pattern capable of uniformly keeping the coding pattern in a case where the determination unit determines that the coding pattern cannot be uniformly kept.

2. The image processing apparatus according to claim 1, wherein the changing unit changes the halftone pattern used in the halftone process to another halftone pattern having a highest line number among a plurality of halftone patterns capable of uniformly keeping the coding pattern in the image with which the coding pattern is synthesized.

3. The image processing apparatus according to claim 1, further comprising:
   a display unit; and
   a display control unit configured to cause the display unit to display a selection screen for allowing a user to select a halftone pattern to be used in the halftone process from among a plurality of halftone patterns capable of uniformly keeping the coding pattern.

4. The image processing apparatus according to claim 1, wherein priorities are respectively set for a plurality of halftone patterns in advance, and
   wherein the changing unit changes the halftone pattern used in the halftone process to another halftone pattern having a highest priority among a plurality of halftone patterns capable of uniformly keeping the coding pattern.

5. The image processing apparatus according to claim 1, wherein the other halftone pattern is a halftone pattern in which a screen angle of an image with which the coding pattern is synthesized does not coincide with an angle of the coding pattern.

6. The image processing apparatus according to claim 1, further comprising a print unit configured to print a printed matter with which the coding pattern, which is subjected to the halftone process using the other halftone pattern changed by the changing unit, is synthesized.

7. The image processing apparatus according to claim 1, wherein the image processing apparatus is an information processing apparatus that generates PDL data for causing a printer to print a printed matter with which the coding pattern is synthesized.

8. The image processing apparatus according to claim 1,
wherein, in a case where a halftone pattern to be changed to is selected, the selected halftone pattern to be changed to is used, and
wherein, in a case where a halftone pattern to be changed to is not selected,
a display unit displays a selection screen for allowing a user to select a halftone pattern to be used in the halftone process from among a plurality of halftone patterns capable of uniformly keeping the coding pattern.

9. The image processing apparatus according to claim 1,
wherein, in a case where a halftone pattern to be changed to is selected, the selected halftone pattern to be changed to is used, and
wherein, in a case where a halftone pattern to be changed to is not selected,
priorities are respectively set for a plurality of halftone patterns in advance, and
the changing unit changes the halftone pattern used in the halftone process to another halftone pattern having a highest priority among a plurality of halftone patterns capable of uniformly keeping the coding pattern.

10. The image processing apparatus according to claim 1, further comprising:
a multiplexing unit that includes a setting for enabling or disabling a multiplexing function, wherein
the changing unit is configured to change the halftone pattern in a case where the multiplexing function is enabled, and
the changing unit is configured to not change the halftone pattern in a case where the multiplexing function is not enabled.

11. A control method for an image processing apparatus, the control method comprising:
a setting step of setting, from among a plurality of halftone patterns, a halftone pattern to be used in a halftone process to be performed for an image with which a coding pattern is visually synthesized;
a determination step of determining whether the coding pattern can be uniformly kept after the halftone process is performed using the halftone pattern set in the setting step; and
a changing step of changing the halftone pattern used in the halftone process to another halftone pattern capable of uniformly keeping the coding pattern in a case where it is determined in the determination step that the coding pattern cannot be uniformly kept.

12. A non-transitory computer-readable storage medium storing a control program causing a computer to execute a control method for an image processing apparatus, the control method comprising:
a setting step of setting, from among a plurality of halftone patterns, a halftone pattern to be used in a halftone process to be performed for an image with which a coding pattern is visually synthesized;
a determination step of determining whether the coding pattern can be uniformly kept after the halftone process is performed using the halftone pattern set in the setting step; and
a changing step of changing the halftone pattern used in the halftone process to another halftone pattern capable of uniformly keeping the coding pattern in a case where it is determined in the determination step that the coding pattern cannot be uniformly kept.

* * * * *